United States Patent
Zhang et al.

(10) Patent No.: US 11,812,354 B2
(45) Date of Patent: Nov. 7, 2023

(54) EMERGENCY CALL BASED ON VEHICLE-TO-VEHICLE COMMUNICATION

(71) Applicant: HUAWEI TECHNOLOGIES CO., LTD., Shenzhen (CN)

(72) Inventors: Hao Zhang, Shenzhen (CN); Hongzhen Zhong, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 275 days.

(21) Appl. No.: 17/297,311

(22) PCT Filed: Nov. 28, 2018

(86) PCT No.: PCT/CN2018/117982
§ 371 (c)(1),
(2) Date: May 26, 2021

(87) PCT Pub. No.: WO2020/107277
PCT Pub. Date: Jun. 4, 2020

(65) Prior Publication Data
US 2022/0030408 A1    Jan. 27, 2022

(51) Int. Cl.
*H04W 4/90* (2018.01)
*H04W 4/46* (2018.01)
(Continued)

(52) U.S. Cl.
CPC ............... *H04W 4/90* (2018.02); *H04W 4/12* (2013.01); *H04W 4/46* (2018.02); *H04W 92/18* (2013.01)

(58) Field of Classification Search
CPC .......... H04W 4/12; H04W 4/46; H04W 4/48; H04W 4/90; H04W 92/18
See application file for complete search history.

(56) References Cited

U.S. PATENT DOCUMENTS

| 8,223,037 B2 * | 7/2012 | Grotendorst | ........... G08G 1/162 342/454 |
| 10,231,187 B1 * | 3/2019 | Rubin | .............. G08G 1/096791 |

(Continued)

FOREIGN PATENT DOCUMENTS

| CN | 101350134 A | 1/2009 |
| CN | 101917531 A | 12/2010 |

(Continued)

*Primary Examiner* — Jean A Gelin
(74) *Attorney, Agent, or Firm* — Rimon PC

(57) ABSTRACT

A first communications device is disposed in a first vehicle, and the first communications device includes: a first information processing unit, where the first information processing unit obtains first status information of the first vehicle; determines, based on the first status information, whether a vehicle accident occurs; and generates a first emergency call message when determining that the vehicle accident has occurred, where the first emergency call message includes a first accident level; and a first vehicle-to-vehicle communications unit, where the first vehicle-to-vehicle communications unit is coupled to the first information processing unit, and the first vehicle-to-vehicle communications unit receives the first emergency call message from the first information processing unit, and sends the first emergency call message in a first range around the first vehicle. A corresponding second communications device is further provided to send a rescue response message in response to an emergency call message.

20 Claims, 13 Drawing Sheets

(51) Int. Cl.
    *H04W 4/12*    (2009.01)
    *H04W 92/18*   (2009.01)

(56) References Cited

U.S. PATENT DOCUMENTS

| | | | |
|---|---|---|---|
| 10,460,534 B1* | 10/2019 | Brandmaier | G08G 1/0112 |
| 11,418,938 B1* | 8/2022 | Kumar | H04W 4/029 |
| 2016/0071417 A1* | 3/2016 | Lewis | G08G 1/162 |
| | | | 701/301 |
| 2016/0150083 A1 | 5/2016 | Kim | |
| 2016/0318511 A1* | 11/2016 | Rangwala | B60W 30/095 |
| 2018/0233019 A1* | 8/2018 | Werronen | G08B 21/182 |
| 2019/0025856 A1* | 1/2019 | Turato | B60W 10/06 |
| 2019/0088126 A1* | 3/2019 | Banvait | G08G 1/0112 |
| 2019/0279440 A1* | 9/2019 | Ricci | H04W 4/48 |
| 2019/0318549 A1* | 10/2019 | Zeira | G06Q 10/1097 |
| 2019/0394625 A1* | 12/2019 | Kim | H04W 36/0022 |
| 2020/0126414 A1* | 4/2020 | Cho | H04W 4/90 |
| 2020/0145799 A1* | 5/2020 | Baghel | H04L 1/0018 |
| 2020/0192355 A1* | 6/2020 | Lu | G08G 1/09675 |
| 2021/0343148 A1* | 11/2021 | Lee | G06V 20/58 |
| 2021/0409916 A1* | 12/2021 | Briemle | H04W 4/40 |
| 2022/0301435 A1* | 9/2022 | Fefer | G08G 1/167 |

FOREIGN PATENT DOCUMENTS

| | | |
|---|---|---|
| CN | 102867393 A | 1/2013 |
| CN | 103383809 A | 11/2013 |
| CN | 105279913 A | 1/2016 |
| CN | 105303793 A | 2/2016 |
| CN | 103413411 B | 6/2016 |
| CN | 106934731 A | 7/2017 |
| CN | 107248303 A | 10/2017 |
| CN | 108428333 A | 8/2018 |
| KR | 20160009906 A | 1/2016 |
| KR | 20160119345 A | 10/2016 |

* cited by examiner

```
MessageFrame ::= CHOICE{
    ...
    emghFrame EmergencyHelpInformation,          300 Emergency call message/
}                                                Rescue response message

[ASN.1 Code:]
EmergencyHelpInformation ::= SEQUENCE{
    msgCnt MsgCount,
    id OCTET STRING (SIZE(8)),
    -- vehicle ID          301 Vehicle ID
    EmergencyRole role,    302 Message role
    -- accident vehicle or rescue vehicle
    pos Postion3D,         303 Vehicle position
    -- vehicle position
    EmergencyTime time,    304 Accident occurrence time
    -- Accident time
    AccidentType type,     305 Accident type
    -- Type of accident
    RescueState state,     306 Rescue state
    -- Current rescue situation
    AccidentLevel level,   307 Accident level
    -- Accident severity
    AccidentMenInformation accidentmeninformation OPTIONAL,   308 Additional
    -- Additional information for accident vehicle person     accident information
    RescueInformation RescueInformation OPTIONAL;   309 Additional rescue
    -- extern information about rescue              information
}
```

FIG. 3

MessageFrame ::= CHOICE{

...

emghFrame EmergencyHelpInformation,    900 Rescue response message

}

[ASN.1 Code: ]

EmergencyHelpInformation ::= SEQUENCE{
   msgCnt MsgCount,
   id OCTET STRING (SIZE(8)),
   -- vehicle ID    901 Vehicle ID
   EmergencyRole role,    902 Message role
   -- accident vehicle or rescue vehicle
   RescueState state,    903 Rescue state
   -- Current rescue situation
   RescueInformation RescueInformation OPTIONAL;    904 Additional rescue information
   -- extern information about rescue
}

FIG. 9

EMERGENCY CALL BASED ON VEHICLE-TO-VEHICLE COMMUNICATION

CROSS-REFERENCE TO RELATED APPLICATIONS

This application is a National Stage of International Application No. PCT/CN2018/117982 filed on Nov. 28, 2018, which is hereby incorporated by reference in its entirety.

TECHNICAL FIELD

This application relates to the field of communications devices, and in particular, to a first communications device, a second communications device, a first vehicle, a second vehicle, a communications system, and a communications method.

BACKGROUND

When an accident occurs, a vehicle needs a call for rescue. Currently, there are mainly two call for rescue modes. A first mode is that an in-vehicle system (IVS) of a car in incident directly communicates with a public safety answering point (PSAP). The call for rescue may be initiated by a person in the car in the incident by actively pressing an eCall button, or may be automatically initiated by the IVS when the IVS detects an exception of the vehicle, for example, airbag deployment. A second mode is that the vehicle reports, at a specific frequency, speed, acceleration, position information, and a vehicle status to the center server system. The center server system analyzes data reported by the vehicle by using a specific algorithm. When the center server system determines that an abnormality of vehicle data may be caused by an accident, a center server automatically initiates a call for rescue process, and a related maintenance personnel of the center server communicates with an agent of the public safety answering point to complete the call for rescue for the car in incident.

The second mode generates relatively large data traffic, and it is very difficult to accurately analyze data to determine an accident of the vehicle due to poor communication quality. Therefore, the second mode is seldom utilized. Currently, a call for rescue system described in the first mode is widely used in the market. For example, Ford, Volkswagen, Cadillac, Changan, and Toyota are all equipped with a system based on the first mode.

It can be seen that both of the foregoing two modes are call for rescue systems having point-to-point communication, and require that a car in incident have a long-distance communication capability, for example, an LTE communication capability. The first mode further depends on a telephone call between the person in the car in incident and the agent to complete a statement of accident information. If the person in the car in incident cannot make the statement due to an injury, the person in the car in incident may also miss a rescue. The first mode further depends on that the system can still support a continuous operation of an eCall system of the vehicle after the accident. If the eCall system cannot work properly due to physical damage, the call for rescue cannot be initiated.

A serious accident is often accompanied by relatively great randomness. Damage to persons and cars in incidents vary. In a slight accident, damage is not bad. In a serious accident, however, it is difficult to ensure the eCall system will work at the time. Consequently, a previous call for rescue function cannot objectively play a practical role in a timely rescue and an automatic rescue, and this greatly affects life protection of drivers.

In addition, both the two modes depend on the public safety answering point to organize the rescue. As a result, rescue efficiency is restricted by a coordination capability and a work saturation rate of the public safety answering point. If a timely and effective rescue is not obtained due to a lower priority in a queue, safety of persons and property of the car in incident may be damaged.

SUMMARY

Embodiments of this application provide for an emergency call based on near field communication between vehicles, so that a call for rescue of a car in incident does not depend on a remote communication capability, a network quality sufficient to support remote communications, and a representation capability of a person in the car in incident. The "vehicle" mentioned in this application document should be broadly understood as various means of transportation, including a car, a truck, an off-road vehicle, an aircraft, a ship, and the like, that can implement solutions in this application. The "vehicle" should further be broadly understood as various static buildings, roadside facilities, and the like, that can be used to implement the solutions in this application.

To achieve the foregoing objectives, the following technical solutions are used in this application.

According to a first aspect, a first communications device is provided. The first communications device is disposed in a first vehicle, and the first communications device includes:

a first information processing unit, where the first information processing unit obtains first status information of the first vehicle; determines, based on the first status information, whether a vehicle accident occurs; and generates a first emergency call message when determining that the vehicle accident has occurred, where the first emergency call message includes a first accident level; and a first vehicle-to-vehicle communications unit, where the first vehicle-to-vehicle communications unit is coupled to the first information processing unit, and the first vehicle-to-vehicle communications unit receives the first emergency call message from the first information processing unit, and sends the first emergency call message in a first range around the first vehicle.

After sending the first emergency call message, the first information processing unit obtains second status information of the first vehicle.

When the first vehicle-to-vehicle communications unit receives, within a first duration, a rescue response message in response to the first emergency call message, the first information processing unit generates, based on the second status information and the rescue response message, a second emergency call message including a second accident level, and sends the second emergency call message in a second range around the first vehicle.

When the first vehicle-to-vehicle communications unit does not receive, within the first duration, the rescue response message in response to the first emergency call message, the first information processing unit generates a third emergency call message including a third accident level, and sends the third emergency call message in a third range around the first vehicle. An accident severity corresponding to the third accident level is higher than an accident severity of the first accident level. The first emergency call message, the second emergency call message, and the third emergency call message each may have a predetermined structure, including, for example, an ID and a position of the first vehicle, an accident occurrence time, an accident level, an accident ID, and an accident cause classification. The accident ID is used to distinguish different accidents that occur in a same area. In some possible implementations, the first emergency call message, the second emergency call message, and the third emergency call message each may also be generated according to a predetermined protocol. In some possible implementations, the second emergency call message or the third emergency call message may be a result of updating the first emergency call message, and an updating manner may include modifying a rescue state field and/or an accident level field. When the rescue response message is not received within the preset duration, the accident severity represented by the third accident level is higher than that of the first accident level, that is, the accident is escalated because no response is received after a preset time. In some possible implementations, the first information processing unit continuously obtains the second status information. When receiving the rescue response message, the first information processing unit generates the second emergency call message based on a rescue message and the current second status information.

In some possible implementations, the first vehicle-to-vehicle communications unit sends the first emergency call message, the second emergency call message, and the third emergency call message in a broadcast manner. The first range, the second range, and the third range are obtained through, for example, radiating 300 meters to 1000 meters, for example, 400 meters outwards, by using the first vehicle as a center. In an open area, the first range, the second range, and the third range may be obtained through radiating about 1000 meters outwards.

In some possible implementations, the first vehicle-to-vehicle communications unit sends the first emergency call message, the second emergency call message, and the third emergency call message through a PC5 interface. The first range, the second range, and the third range are obtained through, for example, radiating 300 meters to 1000 meters, for example, 400 meters outwards, by using the first vehicle as a center. In an open area, the first range, the second range, and the third range may be obtained through radiating about 1000 meters outwards. The PC5 interface is a PC5 interface defined by 3GPP in LTE R14. Transmission through the PC5 interface uses an existing cellular network and frequency band, and no dedicated roadside unit needs to be constructed.

In some possible implementations, the first accident level is one of a first level, a second level, and a third level, the second accident level is one of the first level, the second level, and the third level, and the third accident level is one of the first level, the second level, and the third level. An accident severity of the first level is higher than that of the second level, and the accident severity of the second level is higher than that of the third level. For example, the first level corresponds to a "dangerous accident", the second level corresponds to an "out-of-control accident", and the third level corresponds to an "ordinary accident".

In some possible implementations, the first emergency call message, the second emergency call message, and the third emergency call message each include a message role, where the message role is a car in incident. The message role indicates a source of the message. The message role is also an interaction protocol feature, so that a rescue vehicle focuses only on a message sent by the car in incident, namely, an emergency call message, and does not pay attention to a message sent by another rescue vehicle, for example, a broadcast message. In this way, all response actions of the rescue vehicle accurately correspond to the car in incident, and an accident event does not spread without limit on a road.

In some possible implementations, after the first vehicle-to-vehicle communications unit sends the first emergency call message, the second emergency call message, or the third emergency call message, the first information processing unit notifies a display system and an audio system of the first vehicle that the first emergency call message, the second emergency call message, or the third emergency call message has been sent. In this way, a person in the first vehicle may learn that the first vehicle-to-vehicle communications unit has performed a nearby emergency call and may learn content of the emergency call.

In some possible implementations, when the first vehicle-to-vehicle communications unit receives the rescue response message, the first information processing unit notifies the display system of the first vehicle of the rescue vehicle information. In this way, the person in the first vehicle may learn that the first vehicle-to-vehicle communications unit has received a rescue response from a nearby vehicle and may learn what the rescue response is.

In some possible implementations, the second status information includes remaining at a predetermined body status within a preset duration after the first emergency call message is sent. For example, a time in which a temperature in the vehicle is higher than a threshold reaches the preset duration, or a time in which a door of the vehicle is not opened reaches the preset duration.

In some possible implementations, after the second emergency call message is sent, the first information processing unit determines whether a rescue is completed:

when the rescue is completed, the first information processing unit notifies the first vehicle-to-vehicle communications unit not to send the second emergency call message; or when the rescue is not completed, the first information processing unit detects whether the first vehicle-to-vehicle communications unit receives another rescue response message.

In some possible implementations, after the third emergency call message is sent, the first information processing unit determines whether a rescue is completed:

when the rescue is completed, the first information processing unit notifies the first vehicle-to-vehicle communications unit not to send the third emergency call message; or when the rescue is not completed, the first information processing unit detects whether the first vehicle-to-vehicle communications unit receives another rescue response message.

In some possible implementations, a condition under which the first information processing unit determines that the rescue is completed includes at least one of the following conditions: an emergency call button is operated to end an emergency call, a door of the vehicle is opened, a seat belt is released, and a seat is empty.

In some possible implementations, the second emergency call message includes a rescue state. In some possible implementations, the first emergency call message or the third emergency call message includes the rescue state. The rescue state describes a rescue action that has been performed or is planned to be performed. The rescue state is, for example, "Called eCall" or "No rescue response is received within 10 minutes". In some possible implementations, the first emergency call message includes the rescue state.

According to a second aspect, a second communications device is provided. The second communications device is disposed in a second vehicle, and the second communications device includes:

a second vehicle-to-vehicle communications unit, where the second vehicle-to-vehicle communications unit receives an emergency call message from a first vehicle other than the second vehicle, and the emergency call message includes an accident level; and a second information processing unit, where the second information processing unit is coupled to the second vehicle-to-vehicle communications unit, and the second information processing unit receives the emergency call message from the second vehicle-to-vehicle communications unit, performs a rescue action in response to the emergency call message, generates a rescue response message in response to the emergency call message, and sends the rescue response message to the first vehicle through the second vehicle-to-vehicle communications unit.

The second information processing unit performs the rescue action based on the accident level. The second vehicle-to-vehicle communications unit may automatically take the rescue action based on description of an accident and especially the accident level that are in the emergency call message.

In some possible implementations, the accident level is one of a first level, a second level, and a third level. An accident severity of the first level is higher than that of the second level, and the accident severity of the second level is higher than that of the third level. For example, the first level corresponds to a "dangerous accident", the second level corresponds to an "out-of-control accident", and the third level corresponds to an "ordinary accident".

In some possible implementations, after receiving the emergency call message, the second information processing unit further notifies a display system and an audio system of the second vehicle of an information prompt about the accident of the first vehicle. In this way, a person in the second vehicle may learn that the second vehicle-to-vehicle communications unit has received an emergency call message from a nearby vehicle and may learn what the message is. Therefore, the person in the second vehicle may actively join in the rescue after learning about the accident.

In some possible implementations, when the accident level is the second level, the rescue action includes: the second information processing unit notifies an in-vehicle call for rescue system of the second vehicle to initiate a call for rescue. The rescue system is, for example, an eCall system, and the initiating the call for rescue may be initiating an eCall.

In some possible implementations, when the accident level is the second level, a mode of initiating the call for rescue is sending a call for rescue message to a public safety answering point, the call for rescue message including a message role, where the message role is a rescue vehicle.

In some possible implementations, when the accident level is the second level, the rescue action further includes: after the call for rescue is initiated, the second information processing unit notifies the display system and the audio system of the second vehicle to update a display and audio prompt. The updated content is, for example, a prompt indicating "Called eCall", or "Helping the car in incident to initiate an eCall. After the call is connected, help the person in the car in incident state the accident information to an agent."

In some possible implementations, when the accident level is the first level, the rescue action includes: the second information processing unit notifies the in-vehicle call for rescue system of the second vehicle to initiate the call for rescue, and notifies the display system and/or the audio system of the second vehicle to explicitly prompt a call process. Because the accident level is of a high accident severity, the call process is explicitly prompted, thereby drawing attention of the person in the second vehicle. The explicit prompting is, for example, presenting the call process through audio and/or video.

In some possible implementations, when the accident level is the first level, the rescue action further includes: The second information processing unit notifies the display system and/or the audio system of the second vehicle to display and/or play a contact number of the first vehicle, and prompts to directly call the number of the first vehicle. Therefore, the person in the second vehicle may directly call a person in the first vehicle, to directly communicate an accident situation.

In some possible implementations, when the accident level is the first level, the rescue action further includes: The second information processing unit notifies the display system and the audio system of the second vehicle to update a display and audio prompt. In this way, the person in the second vehicle can follow up a rescue progress in time, and take timely remedial measures in a case of a rescue delay.

In some possible implementations, when the accident level is not the first level or the second level, the rescue action includes: The second information processing unit provides rescue options, where the rescue options include initiating the call for rescue and implementing an onsite rescue.

In some possible implementations, the rescue response message includes the message role, where the message role is the rescue vehicle, and the rescue response message further includes a rescue state. The rescue state describes a rescue action related to the current accident, for example, a rescue action that has been performed or is planned to be performed.

In some possible implementations, the second vehicle-to-vehicle communications unit sends the rescue response message to the first vehicle through a PC5 interface. The PC5 interface is a PC5 interface defined by 3GPP in LTE R14. Transmission through the PC5 interface uses an existing cellular network and frequency band, and no dedicated roadside unit needs to be constructed.

According to a third aspect, a first vehicle is provided, and the first vehicle is equipped with the first communications device according to any implementation of the first aspect.

According to a fourth aspect, a second vehicle is provided, and the second vehicle is equipped with the second communications device according to any implementation of the second aspect.

According to a fifth aspect, an emergency call method for a first communications device is provided. The first communications device is disposed in a first vehicle, and includes the following steps:

obtaining first status information of the first vehicle; determining, based on the first status information, whether a vehicle accident occurs; and generating a first emergency call message when determining that the vehicle accident has occurred, where the first emergency call message includes a first accident level;

sending the first emergency call message in a first range around the first vehicle;

after sending the first emergency call message, obtaining second status information of the first vehicle; and when a rescue response message in response to the first emergency call message is received within a first duration, generating, based on the second status information and the rescue response message, a second emergency call message including a second accident level, and sending the second emergency call message in a second range around the first vehicle; or when the rescue response message in response to the first emergency call message is not received within the first duration, generating a third emergency call message including a third accident level, and sending the third emergency call message in a third range around the first vehicle, where an accident severity corresponding to the third accident level is higher than an accident severity of the first accident level. The first emergency call message, the second emergency call message, and the third emergency call message each may have a predetermined structure, including, for example, an ID and a position of the first vehicle, an accident occurrence time, an accident level, an accident ID, and an accident cause classification. The accident ID is used to distinguish different accidents that occur in a same area. In some possible implementations, the first emergency call message, the second emergency call message, and the third emergency call message each may also be generated according to a predetermined protocol. In some possible implementations, the second emergency call message or the third emergency call message may be a result of updating the first emergency call message, and an updating manner may include modifying a rescue state field and/or an accident level field. In some possible implementations, the first information processing unit continuously obtains the second status information. When receiving the rescue response message, the first information processing unit generates the second emergency call message based on a rescue message and the current second status information. When the rescue response message is not received within the preset duration, the accident severity represented by the third accident level is, for example, higher than that of the first accident level. In this case, the accident is escalated because no response is received after a preset time.

In some possible implementations, the first emergency call message, the second emergency call message, and the third emergency call message are sent in a broadcast manner. The first range, the second range, and the third range are obtained through, for example, radiating 300 meters to 1000 meters, for example, 400 meters outwards, by using the first vehicle as a center. In an open area, the first range, the second range, and the third range may be obtained through radiating about 1000 meters outwards.

In some possible implementations, the first emergency call message, the second emergency call message, and the third emergency call message are sent through a PC5 interface. The PC5 interface is a PC5 interface defined by 3GPP in LTE R14. Transmission through the PC5 interface uses an existing cellular network and frequency band, and no dedicated roadside unit needs to be constructed.

In some possible implementations, the first accident level is one of a first level, a second level, and a third level, the second accident level is one of the first level, the second level, and the third level, and the third accident level is one of the first level, the second level, and the third level. An accident severity of the first level is higher than that of the second level, and the accident severity of the second level is higher than that of the third level.

In some possible implementations, the first emergency call message, the second emergency call message, and the third emergency call message each include a message role, where the message role is a car in incident.

In some possible implementations, after the first emergency call message, the second emergency call message, or the third emergency call message is sent, a display system and an audio system of the first vehicle are notified that the first emergency call message or the second emergency call message has been sent.

In some possible implementations, when a rescue response message from another vehicle is received, the display system of the first vehicle is notified of rescue vehicle information.

In some possible implementations, the second status information includes reaching a predetermined body status within preset duration after an emergency call message is sent. For example, a time in which a temperature in the vehicle is higher than a threshold reaches the preset duration, or a time in which a door of the vehicle is not opened reaches the preset duration.

In some possible implementations, after the second emergency call message is sent, it is determined whether a rescue is completed:

when the rescue is completed, stopping sending the second emergency call message in a second range around the first vehicle; or when the rescue is not completed, detecting whether another rescue response message is received.

In some possible implementations, after the third emergency call message is sent, it is determined whether a rescue is completed:

when the rescue is completed, stopping sending the third emergency call message in a third range around the first vehicle; or when the rescue is not completed, detecting whether another rescue response message is received.

In some possible implementations, a condition of determining that the rescue is completed includes at least one of the following conditions: an emergency call button is operated to end an emergency call, a door of the vehicle is opened, a seat belt is released, and a seat is empty.

In some possible implementations, the second emergency call message includes a rescue state. The rescue state describes a rescue action that has been performed or is planned to be performed. The rescue state is, for example, "Called eCall".

According to a sixth aspect, a call response method for a second communications device is provided. The second communications device is disposed on a second vehicle, and includes the following steps:

receiving an emergency call message from a first vehicle other than the second vehicle, where the emergency call message includes an accident level; and performing a rescue action in response to the emergency call message, generating a rescue response message in response to the emergency call message, and sending the rescue response message to the first vehicle.

The rescue action is performed based on the accident level.

In some possible implementations, the accident level is one of a first level, a second level, and a third level. An accident severity of the first level is higher than an accident severity of the second level, and the accident severity of the second level is higher than an accident severity of the third level.

In some possible implementations, after the emergency call message is received, a display system and an audio system of the second vehicle is further notified of an information prompt about the accident of the first vehicle.

In some possible implementations, when the accident level is the second level, the rescue action includes: notifying a call for rescue system of the second vehicle to initiate a call for rescue.

In some possible implementations, when the accident level is the second level, a mode of initiating the call for rescue is sending a call for rescue message to a public safety answering point, the call for rescue message includes a message role, and the message role is a rescue vehicle.

In some possible implementations, when the accident level is the second level, the rescue action further includes: after the call for rescue is initiated, notifying the display system and the audio system of the second vehicle to update a display and audio prompt. For example, "Helping the car in incident to initiate an eCall. After the call is connected, help the person in the car in incident state the accident information to an agent."

In some possible implementations, when the accident level is the first level, the rescue action includes: notifying the in-vehicle call for rescue system of the second vehicle to initiate the call for rescue, and notifying the display system and/or the audio system of the second vehicle to explicitly prompt a call process. The explicit prompting is, for example, presenting the call process through audio and/or video.

In some possible implementations, when the accident level is the first level, the rescue action further includes: notifying the display system and/or the audio system of the second vehicle to display and/or play a contact number of the first vehicle, and prompting to directly call the number of the first vehicle.

In some possible implementations, when the accident level is the first level, the rescue action further includes: notifying the display system and the audio system of the second vehicle to update a display and audio prompt.

In some possible implementations, when the accident level is not the first level or the second level, the rescue action includes: providing rescue options, where the rescue options include initiating the call for rescue and implementing an onsite rescue.

In some possible implementations, the rescue response message includes the message role, the message role is the rescue vehicle, and the rescue response message further includes a rescue state.

In some possible implementations, the rescue response message is sent to the first vehicle through a PC5 interface. The PC5 interface is a PC5 interface defined by 3GPP in LTE R14. Transmission through the PC5 interface uses an existing cellular network and frequency band, and no dedicated roadside unit needs to be constructed.

According to a seventh aspect, a computer storage medium is provided, including computer instructions. When the computer instructions are run on an electronic device, the electronic device is enabled to perform the emergency call method for the first vehicle according to any one of the possible implementations of the fifth aspect.

According to an eighth aspect, a computer storage medium is provided, including computer instructions. When the computer instructions are run on an electronic device, the electronic device is enabled to perform the call response method for the second vehicle according to any one of the possible implementations of the sixth aspect.

According to a ninth aspect, an embodiment of this application provides a computer program product. When the computer program product is run on a computer, the computer is enabled to perform the emergency call method for the first vehicle according to any one of the possible implementations of the fifth aspect.

According to a tenth aspect, an embodiment of this application provides a computer program product. When the computer program product is run on a computer, the computer is enabled to perform the call response method for the second vehicle according to any one of the possible implementations of the sixth aspect.

According to an eleventh aspect, a radio resource configuration apparatus is provided, and is applied to an access network device. The radio resource configuration apparatus includes a processor, and the processor is configured to: be coupled to a memory, read instructions in the memory, and perform, according to the instructions, the emergency call method according to any one of the possible implementations of the fifth aspect.

According to a twelfth aspect, a radio resource configuration apparatus is provided, and is applied to an access network device. The radio resource configuration apparatus includes a processor, and the processor is configured to: be coupled to a memory, read instructions in the memory, and perform, according to the instructions, the call response method according to any one of the possible implementations of the sixth aspect.

According to a thirteenth aspect, a system for implementing inter-device communication is provided. The system includes the first communications device according to any one of the possible implementations of the first aspect and the second communications device according to any one of the possible implementations of the second aspect.

The foregoing and other aspects of this application are clearer and easier to understand in descriptions of the following embodiments.

BRIEF DESCRIPTION OF DRAWINGS

FIG. 3 is a structure of an emergency call message according to an embodiment of this application;

FIG. 9 is a structure of a rescue response message according to an embodiment of this application;

DESCRIPTION OF EMBODIMENTS

Figure 1:
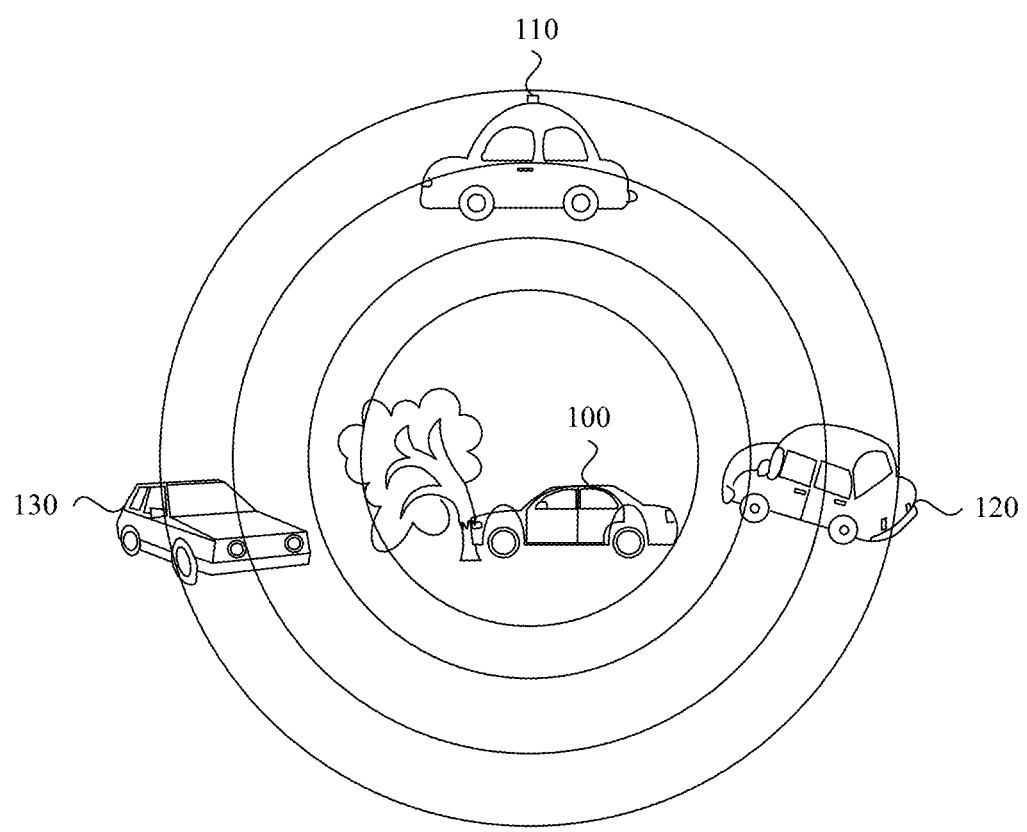
FIG. 1 is an application scenario of a first communications device and a second communications device according to an embodiment of this application.

For ease of understanding, some concepts related to embodiments of this application are provided as examples for reference, shown as follows:

In-vehicle infotainment: In this specification, the in-vehicle infotainment usually refers to an in-vehicle infotainment product, which may be an in-vehicle navigation entertainment multimedia device mounted in the center of a cabin, and has audio output and interface display functions. The in-vehicle infotainment is also referred to as an in-vehicle infotainment system or IVI.

Electronic control unit (ECU): The electronic control unit is also referred to as a "driving computer", a "vehicle-mounted computer", or the like, and is a vehicle-specific microcomputer controller.

eCall: The eCall is launched in Europe to provide a rapid rescue for a motor vehicle in an accident. Initiating an eCall means that a particular device mounted in a vehicle automatically calls 112 in a serious road accident, wirelessly starts to use an airbag and influences sensor information, and enables a GPS, Galileo (Galileo positioning system), or BeiDou navigation satellite system to coordinate a local call for rescue agency. Generally, a call button for manual operations is also provided.

Telematics box (T-BOX): The telematics box is a box-shaped ECU unit that is mounted inside a vehicle body and that can collect electronic status information of other ECUs in a vehicle body network, can collect vehicle body information such as a door status and an airbag status, and can provide 3GPP/LTE data with an internet access service data channel (for example, China Telecom/China Mobile/China Unicom) for an in-vehicle infotainment to, for example, initiate an eCall.

Vehicle to everything (V2X): The V2X is an information communications technology that connects a vehicle to everything. V represents the vehicle, and X represents any object that exchanges information with the vehicle. Currently, X mainly includes a vehicle, a pedestrian, roadside infrastructure, and a network. Information modes of V2X overview interaction include: vehicle to vehicle (V2V), vehicle to infrastructure (V2I), vehicle to pedestrian (V2P), and vehicle to network (V2N).

C-V2X: The C-V2X is a V2X wireless communications technology based on a cellular technology, and is evolved from cellular network communications technologies such as 3G, 4G, and 5G, including two types of communications interfaces: one is a short-range direct communications interface (PC5) between a vehicle, a pedestrian, and a road, and the other is a communications interface (Uu) between a terminal and a base station and that can implement long-distance and large-scale reliable communication. The C-V2X is a communications technology based on 3GPP global standards, including LTE-V2X and 5G-V2X. From a perspective of technology evolution, the LTE-V2X supports smooth evolution to the 5G-V2X.

LTE-V2X: The LTE-V2X is a lower-level concept of the C-V2X. The C-V2X was standardized by 3GPP in LTE R14 in 2016, including two interfaces: (a): a wide area network (WAN) LTE interface (Uu), connecting terminal devices and vehicles to mobile network base stations and mobile core networks to provide internet and V2N services; and (b): a direct communications interface (PC5), configured to connect the V2V, V2I, and V2P, so as to provide a vehicle service with low latency and high reliability. The LTE-V2X (PC5) interface does not require assistance from a mobile network. The PC5 interface in this application refers to a PC5 interface defined by 3GPP in LTE R14.

Dedicated short-range communications technology (DSRC): The dedicated short-range communications technology is a microwave wireless transmission technology based on long-range RFID radio frequency identification, implements real-time bidirectional transmission of images, voice, and data in a small area, and connects vehicles and roads, and vehicles and vehicles. No unified international standard for the DSRC has been established so far. The DSRC is, for example, defined in IEEE802.11p.

The following describes the technical solutions in the embodiments of this application with reference to the accompanying drawings in the embodiments of this application. In descriptions in the embodiments of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions in the embodiments of this application, "a plurality of" means two or more than two.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more of the features. In the descriptions in the embodiments of this application, unless otherwise specified, "a plurality of" means two or more than two.

The technical solutions in the embodiments of this application are applicable to any means of transportation, including but not limited to: fuel vehicles, hybrid vehicles, and electric vehicles; tracked vehicles, and untracked vehicles; ground vehicles, vehicles driven in a suspension mode, and flying vehicles. The "vehicle" mentioned in this application includes any means of transportation that can implement the solutions in this application. Because the solutions in this application are not limited by a traveling speed of the "vehicle", the "vehicle" may also include a static carrier, for example, a building or a roadside facility, on which a first and/or second communications device may be mounted.

FIG. 1 is an application scenario according to an embodiment of this application. A first vehicle 100 is equipped with a first communications device according to the embodiment of this application. The first vehicle 100 is involved in an accident in which the first vehicle 100 cannot continue to run because the first vehicle 100 collided with a tree.

In an example scenario, an active eCall call for rescue system is mounted on the first vehicle 100. A person in the first vehicle 100 may manually trigger an eCall button, so that the system preferably reports vehicle information and GPS information to a background server of the rescue system, and then triggers a call. A background agent answers the call, completes recording of detailed rescue information, and transfers the detailed rescue information to the rescue system to initiate a rescue. However, the person in the first vehicle 100 is currently unable to press the button due to unconsciousness caused by the collision.

In another example scenario, an automatic eCall call for rescue system is mounted on the first vehicle 100. The eCall system automatically checks a vehicle body status. When detecting that an airbag deployment, the eCall system triggers a call for rescue process. Whether a car in incident can be rescued faces several obstacles. First, an eCall emergency call depends on LTE communication. If a network quality of an area in which the car in incident is located does not support long-distance LTE communication, the call for rescue cannot be completed. Second, the eCall emergency call depends on a telephone call between a person in the car in incident and an agent to complete a statement of accident information. If the person in the car in incident cannot make the statement due to an injury, the person in the car in incident may also miss a rescue. Third, the eCall emergency call depends on the eCall system being able to work continuously after an accident. Based on general experience, in a more serious situation, it is harder to ensure that the above three aspects can still work properly. Because a public safety answering point cannot initiate a rescue at the first time, a previous call for rescue function cannot objectively play a practical role in a timely rescue and an automatic rescue, and this greatly affects life protection of drivers.

In another example scenario, no eCall system is mounted on the first vehicle 100. The vehicle and person may not be rescued in time if the person in the vehicle is unconscious and cannot use a mobile phone to call for rescue.

To avoid a case in which a rescue is delayed because an eCall system is missing or a rescue call cannot be completed in an accident, the first vehicle 100 is equipped with a first communications device, so that when an accident occurs, a nearby emergency call can be automatically triggered, and an emergency call message can be sent. The first vehicle 100 broadcasts, for example, through a PC5 interface, by using an LTE-V technology, a position of the first vehicle 100, an orientation of the first vehicle 100 relative to a receiving vehicle, a period of time after an occurrence of the accident, an accident level, and the like to another vehicle in the vicinity (for example, within a range of 400 meters). In some other embodiments, the emergency call message may also be sent by using DSRC. Second vehicles 120, 130, and 140 on each of which a second communications device is mounted in the vicinity receive the emergency call message, perform a corresponding rescue action based on the accident level, and also send a rescue response message in a broadcast manner. In this way, a vehicle that is in a specific vicinity of the second vehicle, for example, the second vehicle 120, sending the response message and that is equipped with the first or second communications device receives the response message. The rescue action may include automatically performing an eCall call, and sending, to the public safety answering point, a message that the first vehicle 100 needs to be rescued. The rescue action may further include sending the message that the first vehicle 100 needs to be rescued and contact details of the person in the first vehicle 100 to a person in the second vehicle 120 through an in-vehicle display terminal of the second vehicle 120. The person in the second vehicle 120 may choose to actively contact the person in the first vehicle 100 and perform an onsite rescue. The first vehicle 100 may update the emergency call message based on conditions such as how long no rescue response message is received, how long no rescue is obtained after the rescue response message is received, and whether the vehicle body status reaches a threshold. In addition, the emergency call ends when the rescue is confirmed to be completed by the person who is being rescued by pressing a button, or the rescue is automatically determined to be completed based on the vehicle body status. In some other embodiments, the first vehicle 100 and the second vehicles 110, 120, and 130 may also communicate with each other by using a DSRC technology, to replace LTE-V communication.

It can be learned that, first, the nearby emergency call of the first vehicle 100 does not depend on a health status of a person, and even if the person is unconscious throughout an entire process, an eCall call, an accident description, and a rescue can be completed.

The first vehicle 100 automatically interacts with another vehicle based on rescue state and a status of the first vehicle, so that the rescue can be performed more effectively and pertinently.

The nearby emergency call of the first vehicle 100 does not depend on communication between the eCall system and a Uu interface. Even if the first vehicle 100 is not equipped with the eCall or the eCall fails in an accident state, the call and the rescue can still be performed effectively. Even if communication with a base station fails due to poor network quality or equipment damage, the call and the rescue can still be performed effectively. Even if the first vehicle 100 cannot be rescued in time due to a load and scheduling reason of the public safety answering point corresponding to the eCall, the first vehicle 100 may actually still obtain direct assistance from a nearby vehicle.

In conclusion, the first vehicle 100 has another path for requesting a rescue in addition to the eCall, thereby improving a chance that the vehicle and especially the person in the vehicle are rescued in time.

Figure 2:
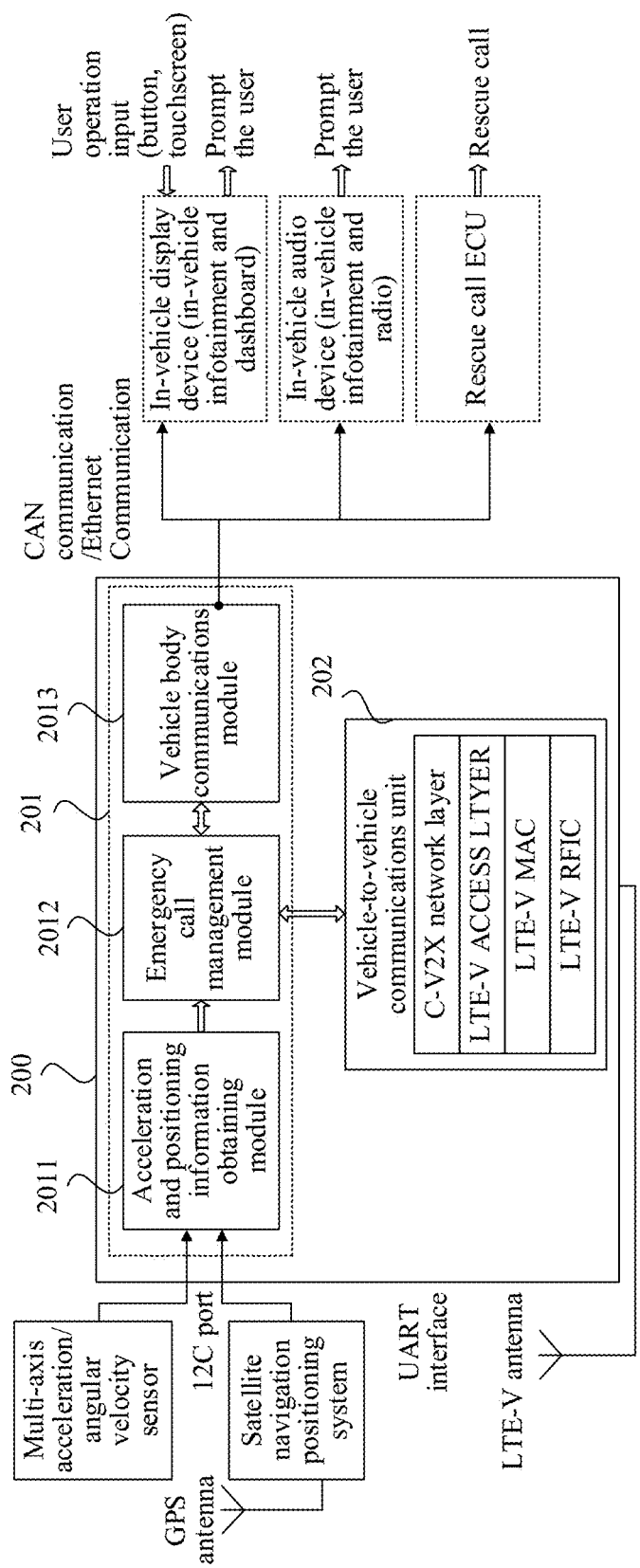
FIG. 2 is a schematic structural diagram of a first communications device according to an embodiment of this application.

FIG. 2 is a schematic structural diagram of a first communications device according to an embodiment of this application.

The first communications device 200 includes an information processing unit 201 and a vehicle-to-vehicle communications unit 202. The information processing unit 201 includes an acceleration and positioning information obtaining module 2011, an emergency call management module 2012, and a vehicle body communications module 2013.

The acceleration and positioning information obtaining module 2011 obtains acceleration information from a multi-axis acceleration sensor mounted on the vehicle. The multi-axis acceleration sensor includes, for example, a three-axis acceleration sensor and/or a three-axis angular velocity sensor. The three-axis acceleration sensor is mounted, for example, on a door, a roof, and a front or rear seat of a vehicle, and can measure accelerations of the vehicle on three axes x, y, and z, to determine, for example, an uphill and downhill condition. The three-axis angular velocity sensor is also referred to as a gyroscope, and can measure a yaw angle of the vehicle, to determine, for example, whether the vehicle is side skidding. The acceleration and positioning information obtaining module 2011 obtains acceleration and angular velocity through, for example, an inter-integrated circuit (I2C) interface.

A satellite navigation positioning system mounted on the vehicle is provided with, for example, a GPS antenna to receive GPS positioning information. In some other embodiments, a corresponding antenna may also be disposed to receive positioning information provided by the GPS, Galileo, the BeiDou satellite, or another positioning system. In this embodiment, the acceleration and positioning information obtaining module 2011 receives the GPS positioning information through, for example, a universal asynchronous receiver/transmitter (UART) interface. The UART includes interface standards and bus standards such as RS232, RS449, RS423, RS422, and RS485, that is, the UART is a collective term of asynchronous serial communications interfaces.

The vehicle body communications module 2013 may communicate with a display device, an audio device, an eCall ECU, another ECU, and the like on the vehicle. The communication may be performed through a controller area network (CAN) bus and/or the Ethernet. The CAN is a serial communications protocol bus used for real-time applications. The CAN can use twisted pairs to transmit signals and is one of the most widely used field buses in the world. The Ethernet is a technology designed for implementing local area network communication, for example, networking may be performed according to the IEEE 802.3 standard. The display device on the vehicle includes, for example, a dashboard and a display module of an in-vehicle infotainment. The display device may collect user instructions, for example, a button pressing and touchscreen touching operation by a user. The display device may further send information to the user in a form of screen display, so as to play a role of prompting the user. The audio device on the vehicle includes, for example, a radio and an audio module of the in-vehicle infotainment. The audio device may collect user instructions, for example, voice input of the user, and may further send information to the user in an audio form, so as to play a role of prompting the user. The eCall ECU is used to initiate an eCall. The other ECU provides the following vehicle body status information: for example, whether a door of the vehicle is open, whether a seat is occupied or empty, whether an airbag is deployed, an absolute value of a temperature inside the vehicle and how much the temperature rises in a specific period, whether an impact sensor detects collision information, and whether a gravity sensor detects gravity anomalies. The other ECU may further include, for example, an ECU that controls a car light, a whistle, and the like. The information processing unit 201 obtains vehicle status information through the vehicle body communications module 2013, receives user instructions, and may further send information to the audio device and/or display device to prompt the user. The information processing unit 201 may further communicate with the eCall ECU through the vehicle body communications module 2013, including collecting eCall status information and initiating an eCall.

The emergency call management module 2012 analyzes the vehicle status information obtained from the acceleration and positioning information obtaining module 2011 and the vehicle body communications module 2013, to determine whether the vehicle has been involved in an accident. For example, if the emergency call management module 2012 detects that an airbag deployed, and/or the acceleration is abnormal, and/or the gravity is abnormal, it is determined that an accident has occurred. When it is determined that an accident occurs, the emergency call management module 2012 generates an emergency call message according to a predetermined interaction protocol, and sends the emergency call message in a specific range around a first vehicle through the vehicle-to-vehicle communications unit 202 coupled to the emergency call management module 2012. The emergency call message may be sent to another vehicle in the specific range around the first vehicle on which the first communications device 200 is mounted. The specific range around the first vehicle refers to a distance in which the first vehicle is used as a center to radiate outwards. For example, radiating 300 meters to 1000 meters. In this embodiment, the specific range is radiating 400 meters outwards. The sending may be implemented in a broadcast manner.

In this embodiment, the vehicle-to-vehicle communications unit 202 is implemented to implement PC5 interface communication. The vehicle-to-vehicle communications unit 202 includes a C-V2X network stack, an LTE-V2X access layer, an LTE-V2X media access control layer (MAC), and an LTE-V2X radio frequency integrated circuit (RFIC). The RFIC receives and sends a message and data through an LTE-V2X antenna that is externally connected to the first communications device 200. In some other embodiments, the LTE-V2X antenna may be manufactured as a component of the first communications device 200. In some other embodiments, the emergency call message may also be sent by using DSRC.

After the vehicle-to-vehicle communications unit 202 sends the emergency call message, the acceleration and positioning information obtaining module 2011 and the vehicle body communications module 2013 continuously obtain status information of the first vehicle, and the vehicle-to-vehicle communications unit 202 receives a rescue response message from the another vehicle. The emergency call management module 2012 updates the emergency call message based on the status information of the first vehicle and the rescue response message, and sends the updated emergency call message to the other vehicle in the specific range around the first vehicle through the vehicle-to-vehicle communications unit 202. For example, if a rescue state field in the rescue response message received by the vehicle is an assisted call, a vehicle accident level in the broadcast emergency call message is reduced for a period of time. If it is still not detected that a door of the car in incident is opened after the period of time, an original level is automatically restored.

FIG. 3 is a structure of an emergency call message according to an embodiment of this application. The emergency call message structure is not only applicable to an emergency call message sent by the first communications device 200 for the first time in a case in which an accident occurs, but also applicable to an emergency call message sent by the first communications device 200 based on an updated vehicle status message and a possible rescue response message. The emergency call message 300 is constructed according to a preset PC5 protocol. In this application, "preset" means that the protocol is preset in a workflow of the first communications device 200 and a workflow of a communication object of the first communications device 200. In addition, a change of the protocol is not limited. For example, the preset protocol may be updated under a condition of coordination with the communication object. The emergency call message 300 includes: a vehicle ID 301, for example, a vehicle license plate number, used to uniquely identify a vehicle such as a first vehicle that sends a current message; a message role 302, for example, a car in incident or a rescue vehicle, where the message role indicates whether the vehicle that sends the current message is the car in incident in need of a rescue, namely, a first vehicle, or the vehicle that gives a rescue, for example, a second vehicle, and the message role is an interaction protocol feature, so that the rescue vehicle focuses only on a broadcast message of the car in incident, and does not pay attention to a broadcast message of another rescue vehicle, so that all response actions of the rescue vehicle accurately correspond to the car in incident, and an accident event does not spread without limit on a road; a vehicle position 303, indicating a geographical position of the vehicle that sends the current message, where the vehicle position may be indicated by GPS positioning information, GPS, Galileo positioning information, or BeiDou navigation satellite positioning information, and the vehicle position may also be described as a position relative to a position of a message receiver (for example, the second vehicle), for example, "200 meters southwest of the current position" or "100 meters in front of the current position"; an accident occurrence time 304, indicating a time when the accident occurred, and reminding the message receiver of an emergency degree of the accident from a perspective of a period of time after the accident; an accident type 305, including, for example, vehicle collision, object collision, engine turning off, and person inability to move; a rescue state 306, including, for example, waiting for a rescue, and having executed a rescue call; additional accident information 308, where the additional accident information 308 may include other information that is helpful for the rescue, for example, contact details of a person in the first vehicle, the period of time after the accident, a temperature in the first vehicle, a landmark building near the first vehicle, and the like, and may further include an accident ID, so as to be distinguished from another accident in a same area; and additional rescue information 309, where the additional rescue information 309 may include further description of the rescue, for example, whether a public safety answering point has arranged the rescue, what kind of rescue has been arranged, and whether another vehicle has rushed to the accident scene. The emergency call message 300 is intended to provide necessary rescue information such as an accident description and a first vehicle position to the receiver. A person skilled in the art may understand that, in different embodiments, the emergency call message 300 may include one or more of the elements listed above, or may include another element that is not listed herein. In some embodiments, the vehicle ID 301 and the vehicle position 303 are mandatory.

Figure 4:
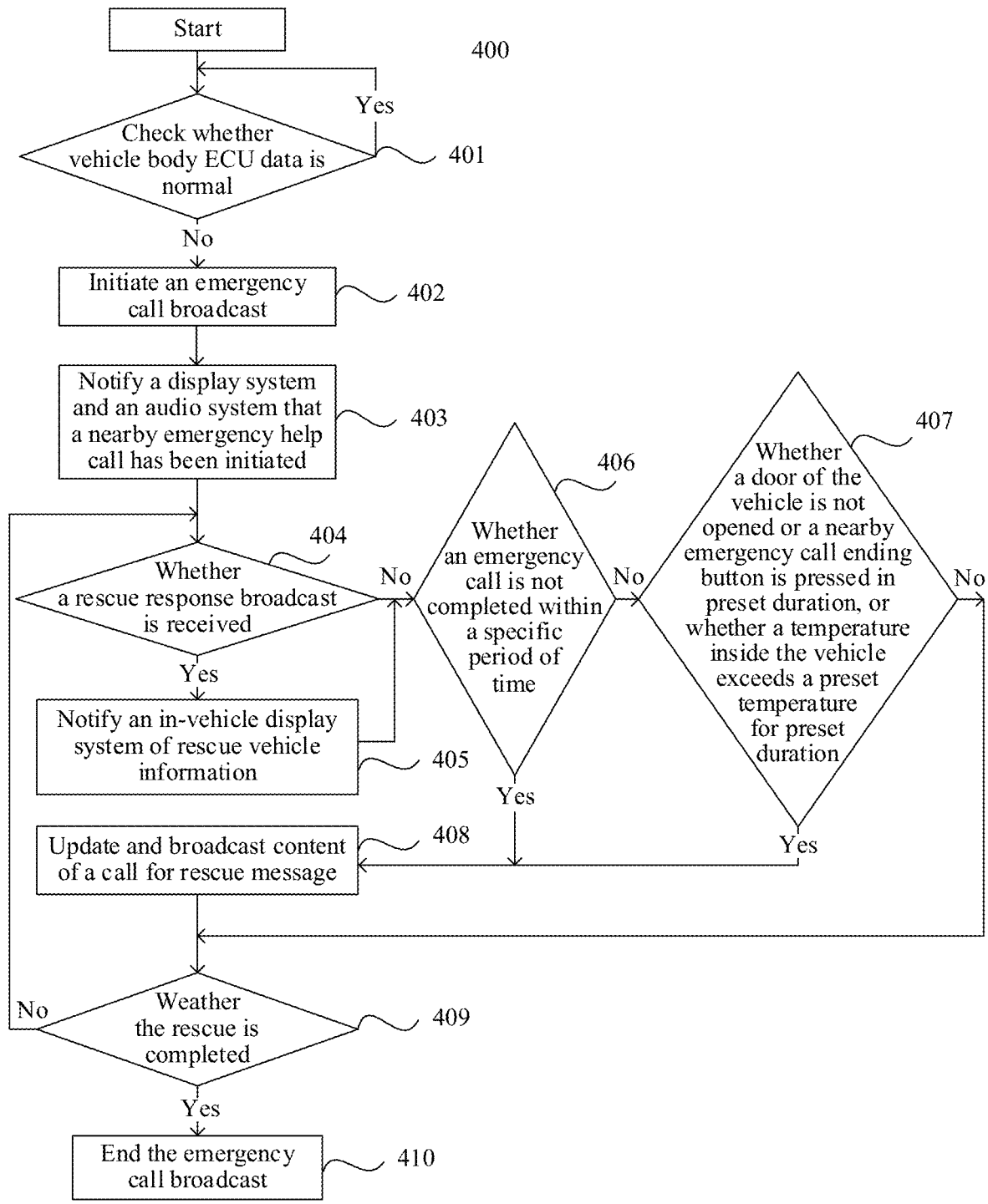
FIG. 4 is a workflow diagram of a first communications device according to an embodiment of this application.

FIG. 4 is a workflow diagram of a first communications device 200 according to an embodiment of this application. In an example workflow 400, in step 401, the emergency call management module 2012 analyzes vehicle status information obtained from the acceleration and positioning information obtaining module 2011 and the vehicle body communications module 2013, including vehicle body ECU data, and determines, based on whether the data is abnormal, whether a vehicle has been involved in an accident. If the data is normal, continue analyzing the vehicle status information. If it is found that, for example, an airbag deployed, it is determined that an accident has occurred, and an emergency call broadcast is initiated in step 402. This step includes: The emergency call management module 2012 generates an emergency call message according to a preset PC5 packet protocol, and sends, in a broadcast manner through the vehicle-to-vehicle communications unit 202, the emergency call message to another vehicle in a specific range around a first vehicle. The emergency call message includes an accident level, for example, the accident level is set to a third level "ordinary accident" in a less serious tree collision accident. The accident level includes, for example, a first level, a second level, and the third level. An accident severity of the first level is higher than that of the second level, and the accident severity of the second level is higher than that of the third level.

In step 403, the emergency call management module 2012 notifies, through the vehicle body communications module 2013, a display system and an audio system in the first vehicle that a nearby help call has been initiated. In this way, the display system and the audio system may send, in a manner of screen display and audio playback, a message indicating that the nearby help call has been initiated to a person in the vehicle. Even if the person cannot receive the message due to being unconscious, work of the first communications device 200 and an emergency call are not affected.

In step 404, the emergency call management module 2012 checks whether a rescue response message is received through the vehicle-to-vehicle communications unit 202. The rescue response message is, for example, sent in a broadcast manner. If the rescue response message is received, for example, "14:10 Jing QFxxxx has helped to call eCall" or "14:10 Jing QFxxxx has helped to call eCall and Jing QFxxxx is on the way to rescue", in step 405, the emergency call management module 2012 notifies the in-vehicle display system of the rescue vehicle information and rescue state information through the vehicle body communications module 2013, and certainly may also notify the audio system. In this way, the updated rescue state may be sent to the person in the vehicle through the display system and the audio system.

If the rescue response message is not received, in step 406, the emergency call management module 2012 checks whether a preset time threshold, for example, 10 minutes, has been reached.

If the preset time threshold is reached, in step 408, the emergency call management module 2012 updates the emergency call message according to a preset interaction protocol, and broadcasts the updated emergency call message through the vehicle-to-vehicle communications unit 202. An updating manner may be, for example, raising the accident level in the emergency call message to the second level "out-of-control accident", and/or updating an elapsed time after an accident occurs.

If a check result of the emergency call management module 2012 in step 406 is that the time threshold has not been reached, in step 407, the emergency call management module 2012 checks whether the door of the vehicle is not opened in a preset duration (for example, 10 minutes), or whether the temperature inside the vehicle exceeds a preset threshold (for example, 35° C.) and is maintained above the preset threshold for a preset duration (for example, 5 minutes), or an emergency call ending button is not pressed in a preset duration, or whether the emergency call ending button is pressed. If it is detected that, for example, the door of the vehicle is not opened for a long time or the temperature is high for a long time, or the emergency call ending button is not pressed in the preset duration, or the emergency call button is operated to end the emergency call, the emergency call message is updated according to the interaction protocol. If the door of the vehicle is not opened in the preset duration and/or the high temperature lasts for more than the preset duration or the emergency call ending button is not pressed in the preset duration, an updating manner includes, for example, raising the accident level to "dangerous accident" and adding a description field for a continuous situation in which the door of the vehicle is not opened, the temperature is high, or the emergency call button is not pressed. If the emergency call button is operated to end the emergency call, the updating manner includes, for example, changing the rescue state to "The emergency call has ended, and a rescue is not required". After the emergency call message is updated, the emergency call management module 2012 broadcasts the updated emergency call message through the vehicle-to-vehicle communications unit 202.

In step 409, the emergency call management module 2012 checks whether the rescue is completed. For example, if the vehicle body communications module 2013 detects that a door of the vehicle is opened, a seat belt is released, or a seat is empty, or detects that the emergency call button is operated to end the emergency call, the emergency call management module 2012 determines that the rescue is completed.

In step 410, the emergency call management module 2012 ends the emergency call broadcast. A manner may be stopping broadcasting the emergency call message, or may be playing an emergency call message including a "Rescue completed" rescue state for a preset duration, and then stopping broadcasting the emergency call message.

Figure 5:
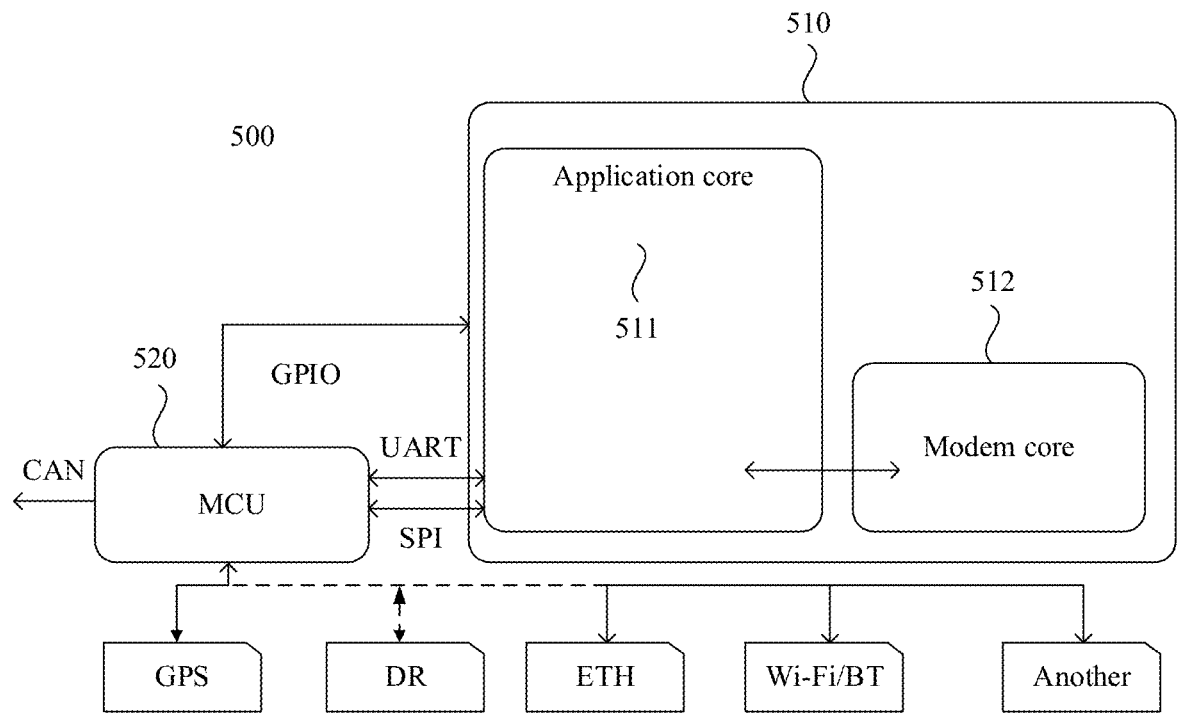
FIG. 5 is a structural diagram of a first communications device according to an embodiment of this application.

FIG. 5 is a structural diagram of a first communications device according to an embodiment of this application. The first communications device 500 is implemented as a chip, that is, a radio resource configuration apparatus, and is used in an access network device. The first communications device 500 includes two sub-chips: a sub-chip 510 and a sub-chip 520. The sub-chip 510 is divided into an application core (AP core) 511 and a modem core 512. The sub-chip 520 includes a microcontroller unit (MCU). The sub-chip 520 may communicate with a CAN bus in a vehicle, to obtain data that is provided by a plurality of ECUs in the vehicle body and that represents a vehicle status. The sub-chip 520 may further communicate with a GPS interface and an inertial navigation sensor (DR). The GPS provides vehicle positioning information. The inertial navigation sensor may include a six-axis gyroscope, where three axes are used to measure acceleration of the vehicle, and the other three axes are used to measure an angular velocity of the vehicle. The sub-chip 520 may further be connected to an Ethernet interface (ETH). The sub-chip 520 may interact with an in-vehicle infotainment through the Ethernet interface or the CAN bus, so as to interact with a display device and an audio device included in the in-vehicle infotainment. The sub-chip 520 may be used as the acceleration and positioning information obtaining module 2011 and the vehicle body communications module 2013 in FIG. 2. The modem core 512 cooperates with an external antenna to communicate with an external device. Therefore, the modem core 512 may implement the vehicle-to-vehicle communications unit 202 in FIG. 2. The application core 511 integrates management logic about an emergency call, and may be used as the emergency call management module 2012 in FIG. 2. The sub-chip 520 exchanges data with the application core 511 in the sub-chip 510 through a UART or a serial peripheral interface (SPI). The sub-chip 520 powers on or off the sub-chip 510 through a general-purpose input/output (GPIO) pin. In some other optional embodiments, the application core 511 may also communicate with the Ethernet interface, a Wi-Fi interface, a Bluetooth interface (BT), and the like, so that the application core 511 not only undertakes a function of the emergency call management module 2012, but also undertakes functions of the acceleration and positioning information obtaining module 2011 and the vehicle body communications module 2013 together with the sub-chip 520.

Figure 6:
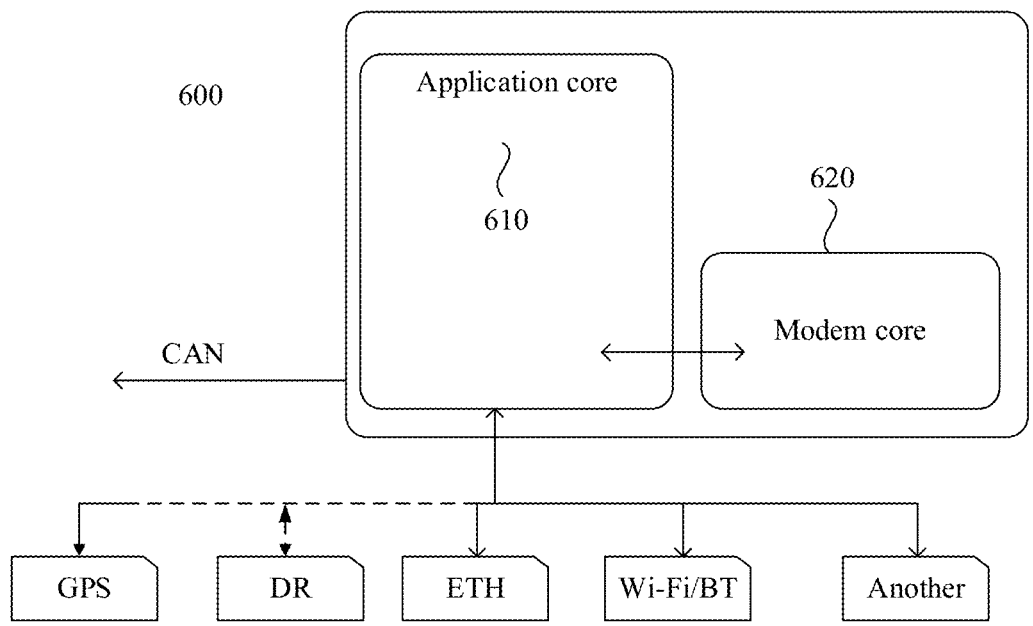
FIG. 6 is a structural diagram of a first communications device according to an embodiment of this application.

FIG. 6 is a structural diagram of a first communications device according to an embodiment of this application. The first communications device 600 is implemented as a chip, that is, a radio resource configuration apparatus, and is used in an access network device. Specifically, the first communications device 600 is implemented as the chip, and is divided into an application core 610 and a modem core 620. The application core 610 may communicate with a CAN bus, a GPS interface, an Ethernet interface, and the like on a vehicle, and includes a logic circuit for emergency call management. Therefore, the application core 610 may implement the acceleration and positioning information obtaining module 2011, the vehicle body communications module 2013, and the emergency call management module 2012 in FIG. 2. The modem core 620 cooperates with an external antenna to communicate with an external device. Therefore, the modem core 620 may implement the vehicle-to-vehicle communications unit 202 in FIG. 2.

Figure 7:
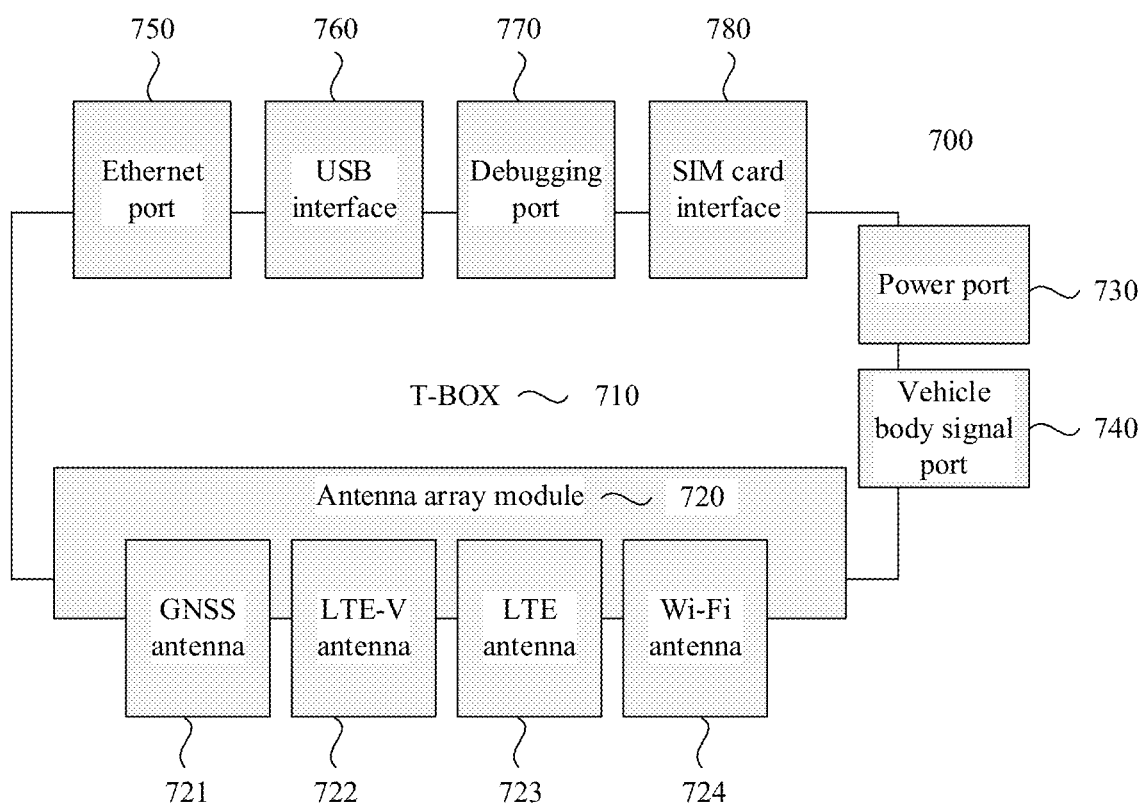
FIG. 7 is a structural diagram of a first communications device according to an embodiment of this application.

FIG. 7 is a structural diagram of a first communications device according to an embodiment of this application. The first communications device may be encapsulated into a T-BOX 700. For example, the first communications device shown in FIG. 5 or FIG. 6 may be encapsulated into the T-BOX 700. The T-BOX may communicate with an ECU inside the vehicle, and may also be connected to an external network such as a cellular network and the internet. A chip that implements the information processing unit 201 and the vehicle-to-vehicle communications unit 202 in FIG. 2 may be encapsulated in a body 710 of the T-BOX 700. An antenna array module 720 and various interfaces may be disposed on the body 710. The antenna array module 720 may include a GNSS antenna 721 for receiving and sending GPS positioning information, an LTE-V antenna 722 connected to an LTE-V network, an LTE antenna 723 connected to an LTE-Uu network, and a Wi-Fi antenna 724. At least the LTE antenna 723 and the Wi-Fi antenna 724 are optional but not necessary for this application. The T-BOX 700 further includes a power interface 730 that provides power required for the operation of the T-BOX 700. The T-BOX 700 further includes a body signal interface 740. The body signal interface 740 may include a CAN bus interface, and is used for ECU communication on the vehicle. Optionally, the body signal interface 740 may also communicate with an in-vehicle infotainment. Optionally, the T-BOX 700 may further include an Ethernet port 750, a USB port 760, a debugging port 770, and a SIM card interface 780. The Ethernet port 750 is used by the T-BOX 700 to communicate with the in-vehicle infotainment. In some vehicles, the Ethernet port 750 may also be used to communicate with an ECU, depending on whether the ECU in the vehicle has an Ethernet communication function. The USB port 760 provides a manner of connecting the T-BOX 700 to the vehicle. The debugging port 770 is used to debug the T-BOX 700, and the debugging is usually performed before delivery. Therefore, the debugging port 770 may be set to be hidden for an end consumer. The SIM card interface 780 is used to access a SIM card to provide traffic required by the T-BOX 700 to communicate with an external device. The SIM card may be inserted into the T-BOX 700, or may be designed as a fixed built-in SIM card.

A vehicle factory or a vehicle user may directly mount the chip-type first communications device shown in FIG. 5 or FIG. 6 in the vehicle, or may mount or connect the encapsulated first communications device shown in FIG. 7 in the vehicle.

Figure 8:
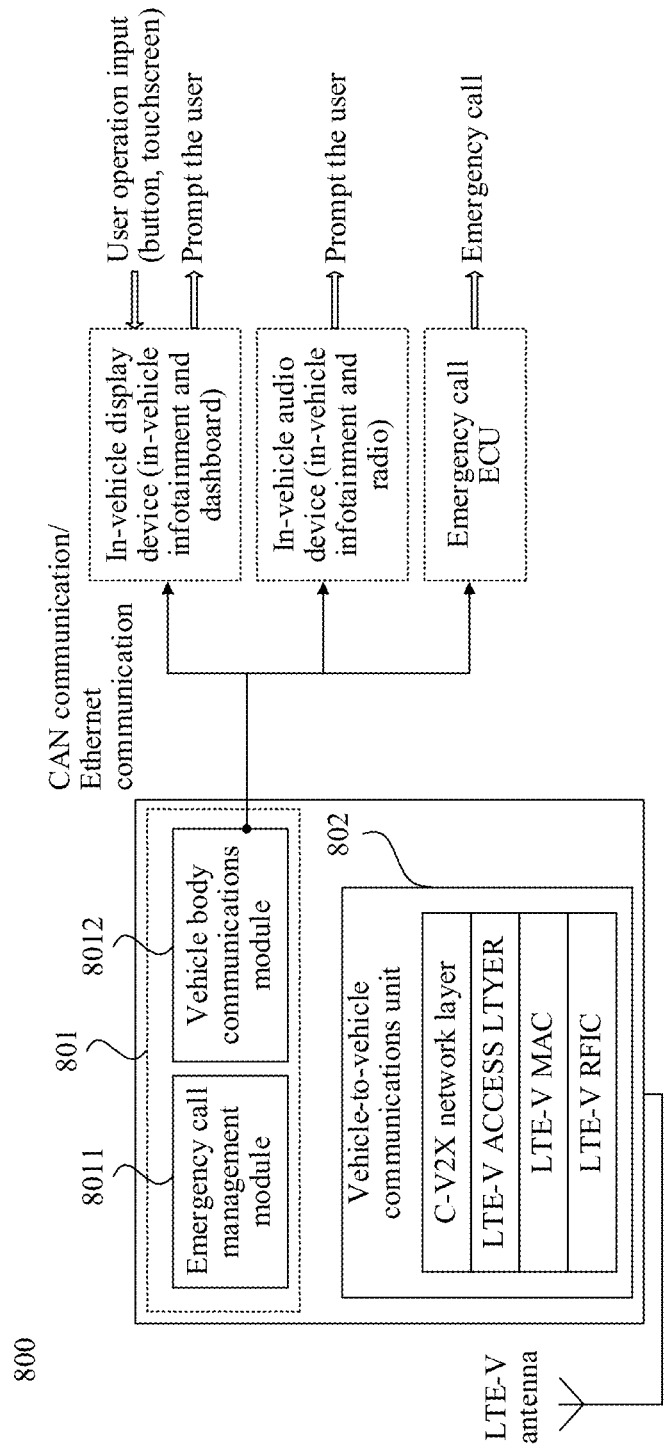
FIG. 8 is a schematic structural diagram of a second communications device according to an embodiment of this application.

FIG. 8 is a schematic structural diagram of a second communications device according to an embodiment of this application.

The second communications device 800 includes an information processing unit 801 and a vehicle-to-vehicle communications unit 802. The information processing unit 201 includes an emergency call management module 8011 and a vehicle body communications module 8012. The second communications device 800 is mounted in a second vehicle. The second vehicle is a vehicle that is located in a specific range around a first vehicle in an accident and that is called by the first vehicle in an emergency, and reference may be made to the second vehicles 120, 130, and 140 in FIG. 1.

The vehicle body communications module 8012 may communicate with a display device, an audio device, an eCall ECU, another ECU, and the like on the vehicle. The communication may be performed through a CAN bus and/or the Ethernet. The CAN can use twisted pairs to transmit signals and is one of the most widely used field buses in the world. The Ethernet is a technology designed for implementing local area network communication, for example, networking may be performed according to the IEEE 802.3 standard. The display device on the vehicle includes, for example, a dashboard and a display module of the in-vehicle infotainment. The in-vehicle infotainment is also referred to as an in-vehicle infotainment system or IVI. The display device may collect user instructions, for example, a button pressing and touchscreen touching operation by the user. The display device may further send information to the user in a form of screen display, so as to play a role of prompting the user. The audio device on the vehicle includes, for example, a radio and an audio module of the in-vehicle infotainment. The audio device may collect user instructions, for example, voice input of the user, and may further send information to the user in an audio form, so as to play a role of prompting the user. The eCall ECU is used to initiate an eCall. The other ECU provides the following vehicle body status information: for example, whether a door of the vehicle is open, whether a seat is occupied or empty, whether an airbag is deployed, an absolute value of a temperature inside the vehicle and how much the temperature has risen in a specific period, whether an impact sensor detects collision information, and whether a gravity sensor detects gravity anomalies. The other ECU may further include, for example, an ECU that controls a car light, a whistle, and the like. The information processing unit 801 obtains vehicle status information through the vehicle body communications module 8012, receives user instructions, and may further send information to the audio device and/or display device to prompt the user. The information processing unit 801 may further communicate with the eCall ECU through the vehicle body communications module 8012, including collecting eCall status information and initiating an eCall.

The vehicle-to-vehicle communications unit 802 may receive an emergency call message sent by the first vehicle other than the second vehicle, and transfer the emergency call message to the emergency call management module 8011. The emergency call management module 8011 analyzes the emergency call message, and performs a rescue action based on an accident level included in the emergency call message. The accident level includes a first level, a second level, and the third level. An accident severity of the first level is higher than that of the second level, and the accident severity of the second level is higher than that of the third level. For example, the first level corresponds to a "dangerous accident", the second level corresponds to an "out-of-control accident", and the third level corresponds to an "ordinary accident". For example, if the accident level is an "out-of-control accident", the emergency call management module 8011 communicates with the eCall ECU, so as to initiate the eCall and send accident information of the first vehicle to a public safety answering point. For another example, if the accident level is an "ordinary accident", the rescue action of the emergency call management module 8011 is to communicate with an audio terminal and a display terminal in the second vehicle, and notify, in a manner of screen display and/or audio, a user on the second vehicle that the user may choose to call eCall and/or perform an onsite rescue. After performing the rescue action, the emergency call management module 8011 generates a rescue response message according to a predetermined interaction protocol, and sends the rescue response message to the first vehicle through the vehicle-to-vehicle communications unit 802 coupled to the emergency call management module 8011. The sending may be implemented in a broadcast manner.

When the accident level in the message broadcast by a car in incident is a vehicle out-of-control accident or a vehicle dangerous accident, a first communications device may optionally enable an ECU-related unit to perform a blinking action such as an exception. The CAN bus transmits commands to a vehicle body ECU to let the vehicle body blink twice quickly, facilitating vehicle direction identification in a dark scenario.

In this embodiment, the vehicle-to-vehicle communications unit 802 is implemented to implement PC5 interface communication. The vehicle-to-vehicle communications unit 802 includes a C-V2X network stack, an LTE-V2X access layer, an LTE-V2X media access control layer (MAC), and an LTE-V2X radio frequency integrated circuit (RFIC). The RFIC receives and sends a message and data through an LTE-V2X antenna that is externally connected to the first communications device 800. In some other embodiments, the LTE-V2X antenna may be manufactured as a component of the first communications device 200. In some other embodiments, the emergency call message may also be sent by using DSRC.

In some embodiments, the second communications device may have a same structure as the first communications device. Therefore, structures in FIG. 2 and FIG. 5 to FIG. 7 may also represent the second communications device. Details are not described herein again.

Referring to FIG. 3, a structure of a rescue response message sent by the second communications device to the first communications device may be the same as a structure of an emergency call message sent by the first communications device to the second communications device. In the rescue response message 300, the vehicle ID 301 is an ID of the second vehicle that sends the rescue response message, and the message role 302 is the rescue vehicle. The rescue state 306 is a rescue state described, based on a rescue action that has been performed, by the second communications device that sends the rescue response message, for example, "Called eCall" and "Rushing to the site for rescue".

In some embodiments, a rescue response message may also have a simplified structure, as shown in FIG. 9. The rescue response message 900 includes a vehicle ID 901, a message role 902, a rescue state 903, and additional rescue information 904. The vehicle ID 901 is an ID of a second vehicle that sends the rescue response message. The message role 902 is a rescue vehicle. The rescue state 903 is a rescue state described, based on a rescue action that has been performed, by the second communications device that sends the rescue response message, for example, "Called eCall" and "Rushing to the site for rescue". The additional rescue information 904 may provide some prompt information that is helpful for a rescue, for example, how long the second vehicle is expected to arrive at the accident scene.

Figure 10A:
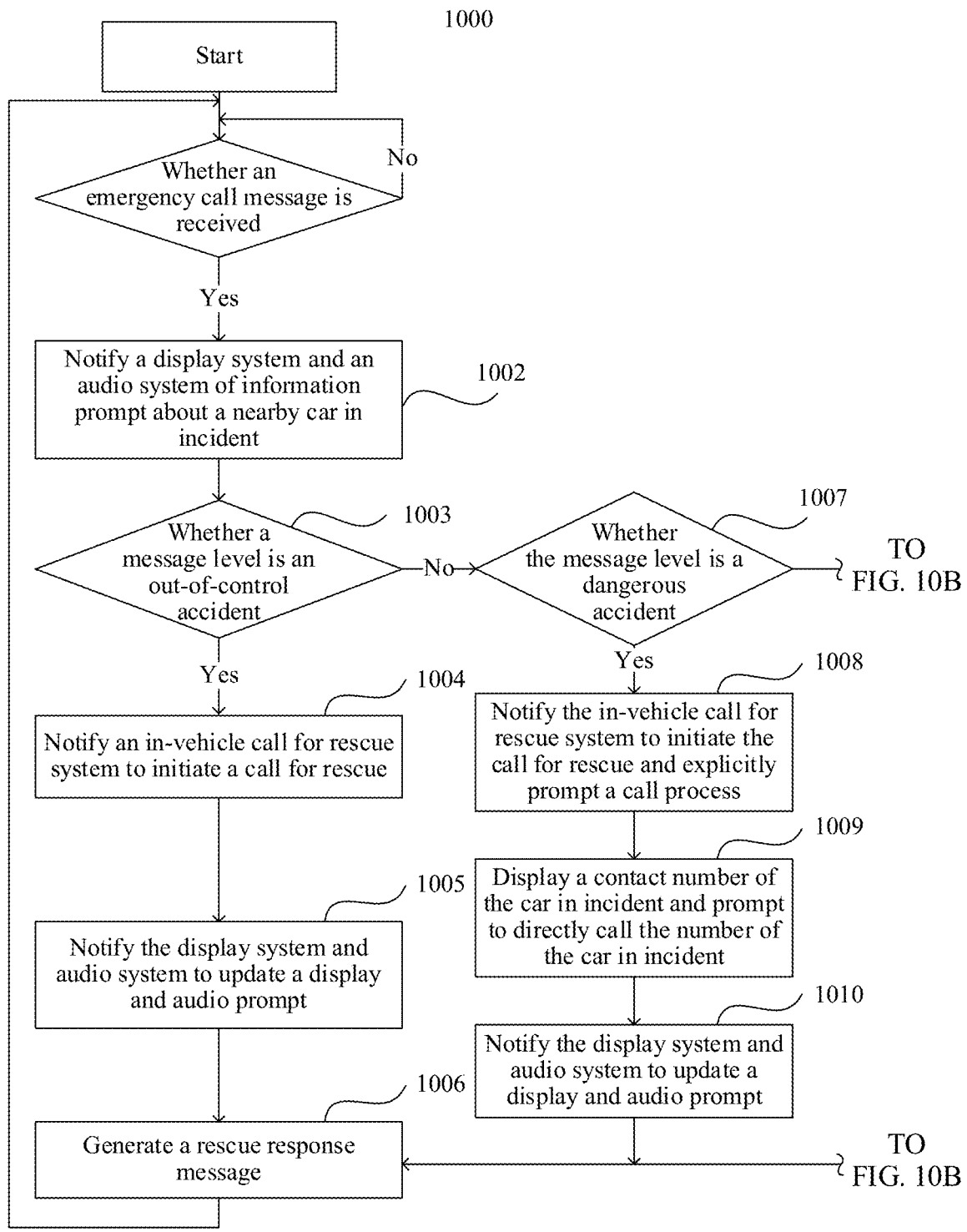
FIG. 10A and FIG. 10 are a workflow of a second communications device according to an embodiment of this application.
Figure 10B:
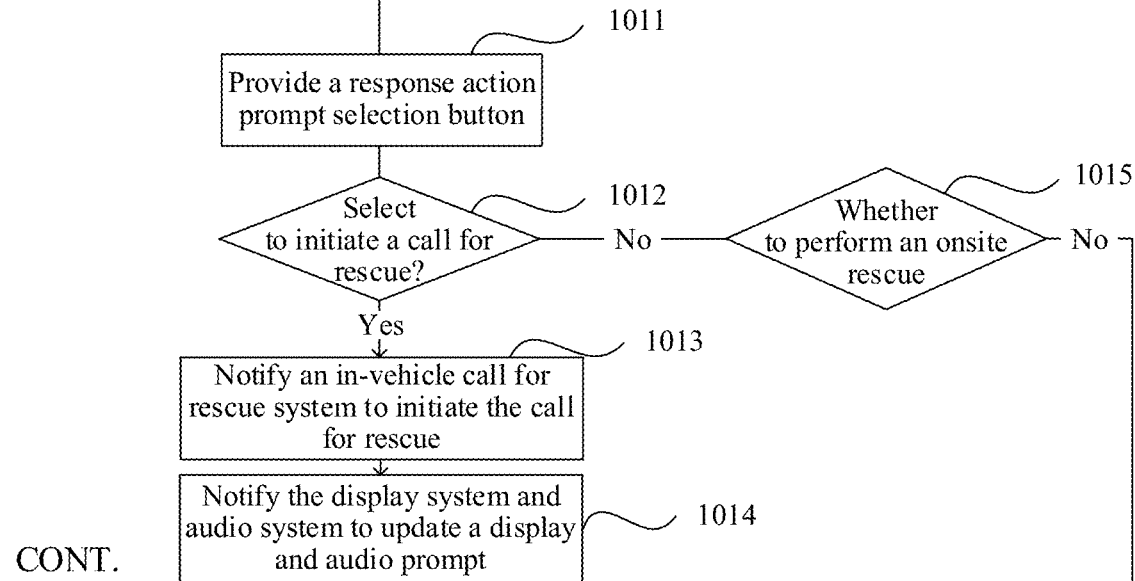

FIG. 10A and FIG. 10B are a workflow of a second communications device according to an embodiment of this application. In this embodiment, the second communications device is implemented as the second communications device 800 in FIG. 8. In step 1001, the emergency call management module 8011 checks whether an emergency call message is received through the vehicle-to-vehicle communications unit 802. If no emergency call message is received, continue the analysis. If the emergency call message is received, in step 1002, the emergency call management module 8011 notifies, through the vehicle body communications unit 8012, a display system and an audio system on the second vehicle of information about a nearby car in incident, including, for example, a position of the car in incident relative to the current vehicle, an accident type, an accident level, and a period of time after the accident.

In step 1003, the emergency call management module 8011 determines whether the accident level is an "out-of-control accident" corresponding to a second level. The accident level includes, for example, a first level, the second level, and a third level. An accident severity of the first level is higher than that of the second level, and the accident severity of the second level is higher than that of the third level. If the accident is the "out-of-control accident", in step 1004, the emergency call management module 8011 notifies, through the vehicle body communications unit 8012, a call for rescue system, for example, an eCall ECU, on the second vehicle, to initiate a rescue call, so as to send information about the car in incident and an accident situation to a public safety answering point. In step 1005, the emergency call management module 8011 notifies, through the vehicle body communications module 8012, the display system and the audio system of the second vehicle to update a display and audio prompt, for example, update the display and audio prompt to "Called eCall". In step 1006, the emergency call management module 8011 generates a rescue response message based on a performed rescue action, where the rescue response message includes, for example, a rescue state "Called eCall", and sends, through the vehicle-to-vehicle communications unit 802, the rescue response message to a first vehicle that sends the emergency call message.

In step 1003, if the emergency call management module 8011 determines that the accident level is not the "out-of-control accident" corresponding to the second level, in step 1007, the emergency call management module 8011 determines whether the accident level is a "dangerous accident" corresponding to the first level. If the accident level is the "dangerous accident", in step 1008, the emergency call management module 8011 notifies, through the vehicle body communications unit 8012, a call for rescue system, for example, an eCall ECU, on the second vehicle, to initiate a rescue call, and notifies the audio system and the display system of the second vehicle to explicitly prompt the call process. In step 1009, the emergency call management module 8011 notifies, through the vehicle body communications unit 8012, the audio system and the display system of the second vehicle of contact details, for example, a phone number, of the car in incident, and prompts a person in the second vehicle to directly call the car in incident. In step 1010, the emergency call management module 8011 notifies, through the vehicle body communications module 8012, the display system and the audio system of the second vehicle to update a display and audio prompt, for example, update the display and audio prompt to "Called eCall". In step 1006, the emergency call management module 8011 generates a rescue response message based on a performed rescue action, where the rescue response message includes, for example, a rescue state "Called eCall", and sends, through the vehicle-to-vehicle communications unit 802, the rescue response message to a first vehicle that sends the emergency call message.

When the accident level in the message broadcast by the car in incident is a vehicle out-of-control accident or a vehicle dangerous accident, the second communications device may attempt to contact the first communications device of the car in incident, so that an ECU-related unit on the car in incident performs a blinking action to show an exception. The CAN bus transmits commands to a vehicle body ECU to enable the vehicle body to activate emergency flashers, facilitating vehicle direction identification in the dark.

In step 1007, if the emergency call management module 8011 determines that the accident level is not a "dangerous accident" corresponding to the first level, in step 1011, the emergency call management module 8011 enables, through the vehicle body communications unit 8012, the display system to provide a rescue action selection button.

In step 1012, the display system queries whether to initiate an eCall call. If the person in the second vehicle selects "Yes", in step 1013, the emergency call management module 8011 notifies, through the vehicle body communications unit 8012, a call for rescue system, for example, an eCall ECU, on the second vehicle, to initiate a rescue call, and in step 1014, notifies the audio system and the display system of the second vehicle to update display and audio prompt, for example, update the display and audio prompt to "Called eCall". In step 1006, the emergency call management module 8011 generates a rescue response message based on a performed rescue action, where the rescue response message includes, for example, a rescue state "Called eCall", and sends, through the vehicle-to-vehicle communications unit 802, the rescue response message to a first vehicle that sends the emergency call message.

If the user selects "No" for whether to initiate the eCall call in step 1012, in step 1015, the display system queries whether to perform an on-site rescue. According to the selection of the person in the second vehicle, in step 1006, the emergency call management module 8011 generates the rescue response message, where the rescue response message includes a rescue state "On a way to the site" or "Cannot provide rescue", and sends, through the vehicle-to-vehicle communications unit 802, the rescue response message to the first vehicle that sends the emergency call message.

It should be understood that the workflow presented in FIG. 10A and FIG. 10B is merely an example, and another embodiment may include only a subset of the workflow or further include more steps.

Figure 11:
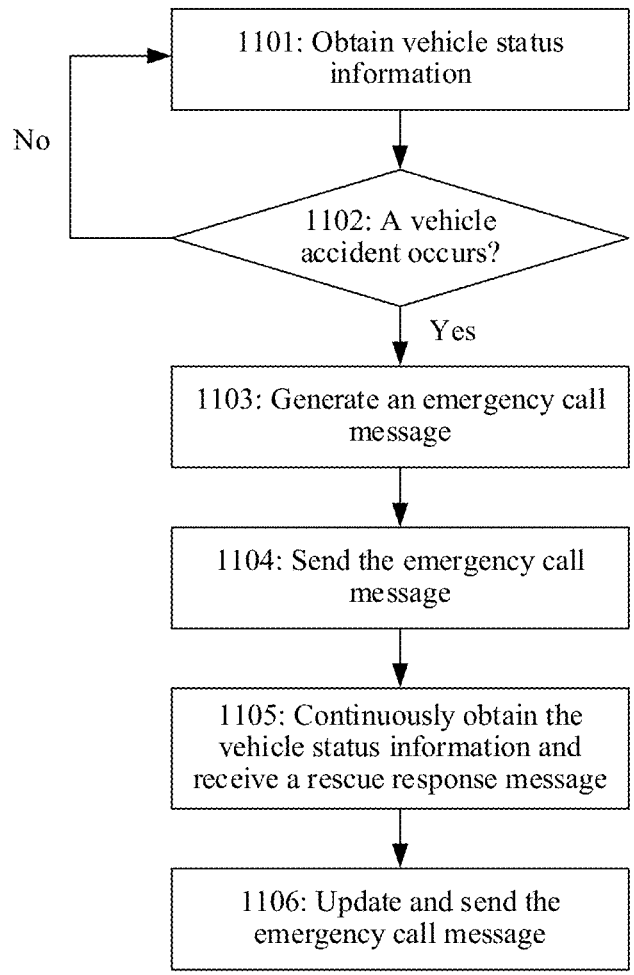
FIG. 11 is an emergency call method for a first communications device according to an embodiment of this application.

FIG. 11 is an emergency call method for a first communications device according to an embodiment of this application. The first communications device is configured to be disposed in a first vehicle. In step 1101, vehicle status information is obtained, for example, data is collected from an airbag, a gravity sensor, an acceleration sensor, an impact sensor, and the like. In step 1102, it is determined whether a vehicle accident has occurred. If no vehicle accident has occurred, continue to analyze a vehicle status. If the vehicle accident occurs, an emergency call message is generated in step 1103. The emergency call message includes an accident level. For example, the accident level includes a first level, a second level, and a third level. An accident severity of the first level is higher than that of the second level, and the accident severity of the second level is higher than that of the third level. For example, the first level corresponds to a "dangerous accident", the second level corresponds to an "out-of-control accident", and the third level corresponds to an "ordinary accident". Optionally, the emergency call message further includes a message role, and the message role is a car in incident. The message role indicates a source of the message. In step 1104, the emergency call message is sent to another vehicle in a specific range around the first vehicle. The sending manner is, for example, broadcasting, especially broadcasting through a PC5 interface. After the emergency call message is sent, in step 1105, vehicle status information is continuously obtained and a rescue response message from the other vehicle is received. In step 1106, a new emergency call message is generated based on the vehicle status information and the rescue response message, and the new emergency call message is sent to the other vehicle in the vicinity of the first vehicle. FIG. 4 is also method steps of an emergency call method for a first communications device according to an embodiment of this application.

Figure 12:
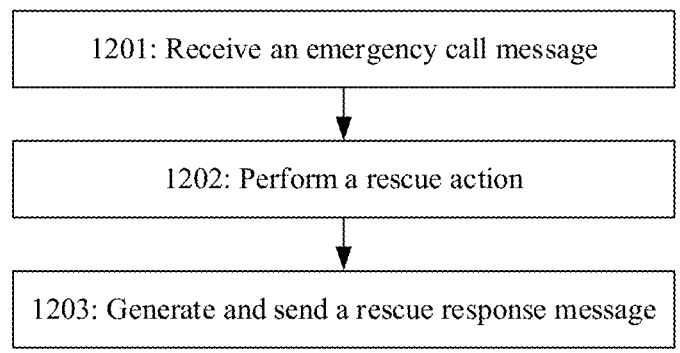
FIG. 12 is a call response method for a second communications device according to an embodiment of this application.

FIG. 12 is a call response method for a second communications device according to an embodiment of this application. The second communications device is mounted in a second vehicle. In step 1201, an emergency call message sent by a first vehicle other than the second vehicle is received. In step 1202, a rescue action is performed based on the accident level included in the emergency call message. For example, the accident level includes a first level, a second level, and a third level. An accident severity of the first level is higher than an accident severity of the second level, and the accident severity of the second level is higher than an accident severity of the third level. For example, the first level corresponds to a "dangerous accident", the second level corresponds to an "out-of-control accident", and the third level corresponds to an "ordinary accident". In step 1203, a rescue response message is generated based on the performed rescue action, and is sent to the first vehicle. Optionally, the rescue response message further includes a message role, and the message role is a car in incident. FIG. 10A and FIG. 10B are also corresponding steps of a call response method for a second communications device according to an embodiment of this application.

Figure 13:
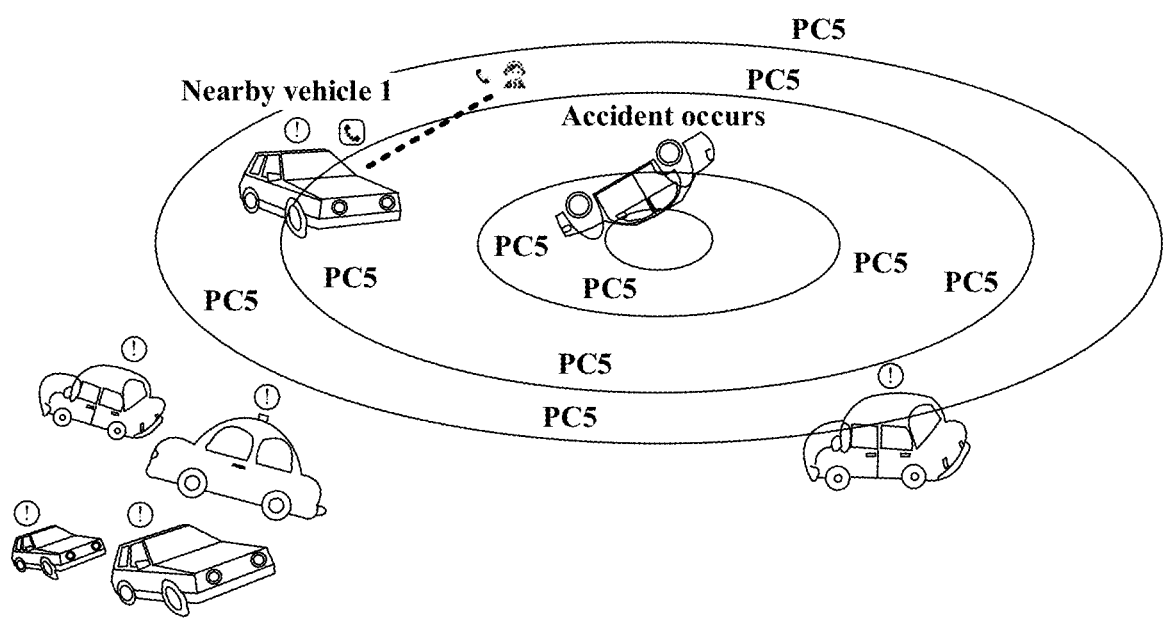
FIG. 13 is a system for implementing inter-device communication according to an embodiment of this application.

FIG. 13 is a system for implementing inter-device communication according to an embodiment of this application. An accident occurs to a vehicle equipped with a first communications device. The first communications device is implemented as a T-Box in this embodiment. If the first communications device senses, through a gravity sensor, that a rollover accident occurs, or senses, based on that an airbag deployment, that an accident has occurred, the first communications device broadcasts an emergency call message through a PC interface. A second communications device on a vehicle in the vicinity of the first vehicle, for example, a nearby vehicle 1, receives the emergency rescue message.

Figure 14:
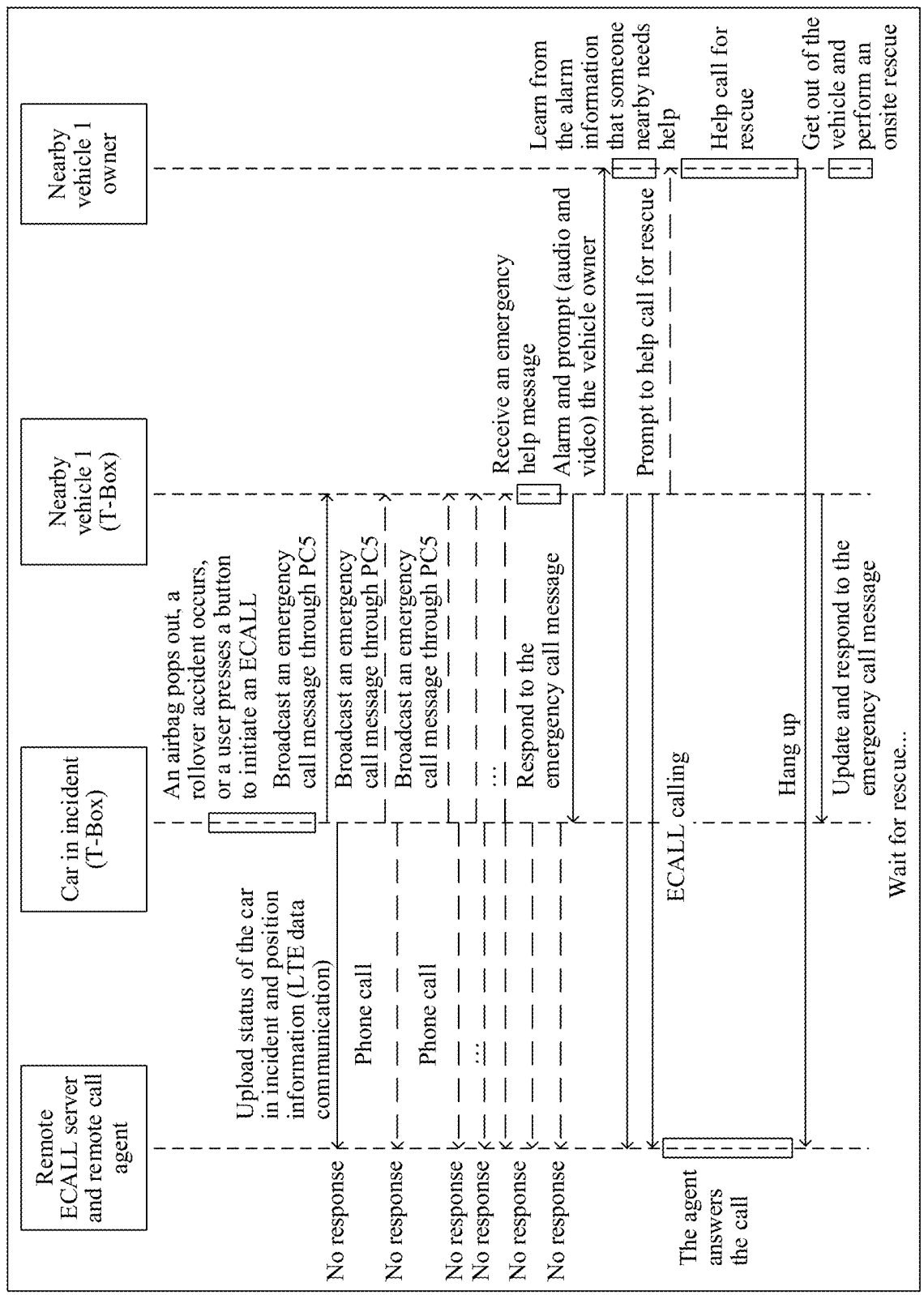
FIG. 14 is an example workflow of the system for implementing inter-device communication in FIG. 13.

FIG. 14 is an example workflow of the system for implementing inter-device communication in FIG. 13. The first communications device on a car in incident determines that an accident has occurred based on airbag deployment, the gravity sensor senses a rollover accident, or a user presses an eCall button. In this case, the first communications device broadcasts the emergency call message through the PC5 interface. Here, however, an eCall call of the car in incident receives no response, and there is no response when uploading the car in incident and position information through LTE-Uu data communication. The second communications device mounted on the nearby vehicle 1 receives the emergency call message, and then warns and prompts the vehicle owner through audio and video. In addition, the second communications device also generates a rescue response message through the PC5 interface, including a rescue state "A person in a rescue vehicle has been notified". The vehicle owner receives the prompt and knows that an accident has occurred to a nearby vehicle. The second communications device automatically initiates an eCall call, and notifies a public safety answering point of information about the car in incident and an accident state. Optionally, the second communications device may further prompt a person in the vehicle to help complete a call for an accident rescue. In this case, after an agent in the eCall public safety answering point answers the call, the person in the vehicle may complete the conversation. After the call is completed, the second communications device updates the rescue response message, for example, updates the rescue response message to including a rescue state "Called eCall". After the person in the rescue vehicle helps call the eCall, the person in the rescue vehicle may further directly drive to the accident scene for rescue.

In conclusion, in the solution of this application, an emergency call manner is extended from a conventional end-to-end call to a point-to-plane call, so that in addition to a conventional call process, an emergency call function adds a capability of performing data exchange by using an LTE-V technology for a nearby vehicle to help make an emergency call, thereby improving an emergency call for rescue effect on a car in incident.

The car in incident does not need to be configured with an eCall system to obtain an emergency call for rescue capability after an accident, and a nearby vehicle can directly know a relative position of the car in incident, for example, a direction, an accident time, and an accident type, so that accident information is disclosed to a vehicle in a nearby area, thereby greatly increasing a chance of the car in incident being rescued.

The nearby vehicle can receive a call message of the car in incident, and an eCall system of the nearby vehicle can be automatically triggered based on a situation of the car in incident (provided that the nearby vehicle is configured with the eCall system). In addition, a person in the nearby vehicle is prompted to call for help, ensuring a rescue rate of a person in the car in incident.

The accident level can be raised based on the situation of the car in incident, and contact details and information of the person in the car in incident can be directly provided to the nearby vehicle based on pre-configured information, so that in the case of an emergency, a person in the vicinity of the car in incident can directly contact the person in the car in incident to know an accident situation and directly perform a rescue.

The person in the car in incident can know an actual quantity of vehicles that are in the vicinity of the car in incident and that participate in the rescue, and positions and information of the rescue vehicles near the car in incident, and communicate related data information with a related display system and audio system in the vehicle, to prompt the person in the car in incident and make the person in the car in incident know a rescue progress.

According to an embodiment of this application, a computer storage medium is further provided, including computer instructions. When the computer instructions are run on an electronic device, the electronic device is enabled to perform an emergency call method for a first vehicle.

According to an embodiment of this application, a computer storage medium is further provided, including computer instructions. When the computer instructions are run on an electronic device, the electronic device is enabled to perform a call response method for a second vehicle.

According to an embodiment of this application, a computer program product is further provided. When the computer program product is run on a computer, the computer is enabled to perform an emergency call method for a first vehicle.

According to an embodiment of this application, a computer program product is further provided. When the computer program product is run on a computer, the computer is enabled to perform a call response method for a second vehicle.

According to an embodiment of this application, a radio resource configuration apparatus is further provided, and is applied to an access network device. The radio resource configuration apparatus includes a processor, and the processor is configured to: be coupled to a memory, read instructions in the memory, and perform, according to the instructions, the emergency call method according to the embodiments of this application. The memory may be an on-chip memory in the radio resource configuration apparatus, or may be an off-chip memory externally connected to the apparatus.

According to an embodiment of this application, a radio resource configuration apparatus is further provided, and is applied to an access network device. The radio resource configuration apparatus includes a processor, and the processor is configured to: be coupled to a memory, read instructions in the memory, and perform, according to the instructions, the call response method for the second vehicle according to any one of the possible implementations of the sixth aspect. The memory may be an on-chip memory in the radio resource configuration apparatus, or may be an off-chip memory externally connected to the apparatus.

All or some of the foregoing embodiments may be implemented by using software, hardware, firmware, or any combination thereof. When software is used to implement the embodiments, the embodiments may be implemented completely or partially in a form of a computer program product. The computer program product may include one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely a logical function division and may be another division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A first communications device, wherein the first communications device is disposed in a first vehicle, and the first communications device comprises:
    a first information processing unit, wherein the first information processing unit obtains first status information of the first vehicle; determines, based on the first status information, whether a vehicle accident has occurred;

and generates a first emergency call message when the vehicle accident has been determined, wherein the first emergency call message comprises a first accident level; and a first vehicle-to-vehicle communications unit, wherein the first vehicle-to-vehicle communications unit is coupled to the first information processing unit, and the first vehicle-to-vehicle communications unit receives the first emergency call message from the first information processing unit, and sends the first emergency call message in a first range around the first vehicle, wherein after sending the first emergency call message, the first information processing unit obtains second status information of the first vehicle; and when the first vehicle-to-vehicle communications unit receives, within a first duration, a rescue response message in response to the first emergency call message, the first information processing unit generates, based on the second status information and the rescue response message, a second emergency call message comprising a second accident level, and sends the second emergency call message in a second range around the first vehicle.

2. The first communications device according to claim 1, wherein when the first vehicle-to-vehicle communications unit does not receive, within the first duration, the rescue response message in response to the first emergency call message, the first information processing unit generates a third emergency call message comprising a third accident level, and sends the third emergency call message in a third range around the first vehicle, wherein an accident severity corresponding to the third accident level is higher than an accident severity of the first accident level.

3. The first communications device according to claim 1, wherein the first vehicle-to-vehicle communications unit sends the first emergency call message and the second emergency call message in a broadcast manner.

4. The first communications device according to claim 1, wherein the first vehicle-to-vehicle communications unit sends the first emergency call message and the second emergency call message through a PC5 interface.

5. The first communications device according to claim 1, wherein the first accident level is one of a first level, a second level, and a third level, and the second accident level is one of the first level, the second level, and the third level, wherein an accident severity of the first level is higher than that of the second level, and the accident severity of the second level is higher than that of the third level.

6. The first communications device according to claim 1, wherein the first emergency call message and the second emergency call message each comprise a message role, and the message role is a car in incident.

7. The first communications device according to claim 1, wherein the second status information comprises reaching a predetermined body status within a preset duration after the first emergency call message is sent.

8. The first communications device according to claim 1, wherein after the second emergency call message is sent, the first information processing unit determines whether a rescue is completed:

when the rescue is completed, the first information processing unit notifies the first vehicle-to-vehicle communications unit not to send the second emergency call message; or when the rescue is not completed, the first information processing unit detects whether the first vehicle-to-vehicle communications unit receives another rescue response message.

9. The first communications device according to claim 8, wherein a condition under which the first information processing unit determines that the rescue is completed includes at least one of the following conditions: an emergency call button is operated to end an emergency call, a door of the vehicle is opened, a seat belt is released, and a seat is empty.

10. The first communications device according to claim 1, wherein the second emergency call message comprises a rescue state.

11. A first communications device, wherein the first communications device is disposed in a first vehicle, and the first communications device comprises:

a first vehicle-to-vehicle communications unit, wherein the first vehicle-to-vehicle communications unit receives an emergency call message from a second vehicle other than the first vehicle, and the emergency call message comprises an accident level; and a first information processing unit, wherein the first information processing unit is coupled to the first vehicle-to-vehicle communications unit, and the first information processing unit receives the emergency call message from the first vehicle-to-vehicle communications unit, performs a rescue action in response to the emergency call message, generates a rescue response message in response to the emergency call message, and sends the rescue response message to the second vehicle through the first vehicle-to-vehicle communications unit, wherein the first information processing unit performs the rescue action based on the accident level.

12. The first communications device according to claim 11, wherein the accident level is one of a first level, a second level, and a third level, wherein an accident severity of the first level is higher than that of the second level, and the accident severity of the second level is higher than that of the third level.

13. The first communications device according to claim 12, wherein when the accident level is the second level, the rescue action comprises: the first information processing unit notifies an in-vehicle call for rescue system of the first vehicle to initiate a call for rescue.

14. The first communications device according to claim 13, wherein when the accident level is the second level, a mode of initiating the call for rescue is sending a call for rescue message to a public safety answering point, the call for rescue message comprises a message role, and the message role is a rescue vehicle.

15. The first communications device according to claim 13, wherein when the accident level is the second level, the rescue action further comprises: after the call for rescue is initiated, the first information processing unit notifies a display system and an audio system of the first vehicle to update a display and audio prompt.

16. The first communications device according to claim 12, wherein when the accident level is the first level, the rescue action comprises: the first information processing unit notifies the in-vehicle call for rescue system of the first vehicle to initiate the call for rescue, and notifies the display system and/or the audio system of the first vehicle to explicitly prompt a call process.

17. The first communications device according to claim 16, wherein when the accident level is the first level, the rescue action further comprises: the first information processing unit notifies the display system and/or the audio system of the first vehicle to display and/or play a contact number of the second vehicle, and prompts to directly call the number of the second vehicle.

18. The first communications device according to claim 12, wherein when the accident level is not the first level or the second level, the rescue action comprises: the first information processing unit provides rescue options, wherein the rescue options comprise initiating the call for rescue and implementing an onsite rescue.

19. The first communications device according to claim 11, wherein the rescue response message comprises the message role, the message role is the rescue vehicle, and the rescue response message further comprises a rescue state.

20. An emergency call method for a first communications device, wherein the first communications device is disposed on a first vehicle, and the method comprises the following steps:

obtaining first status information of the first vehicle;
determining, based on the first status information, whether a vehicle accident has occurred; and generating a first emergency call message when determining that the vehicle accident has occurred, wherein the first emergency call message comprises a first accident level;
sending the first emergency call message in a first range around the first vehicle;
after sending the first emergency call message, obtaining second status information of the first vehicle; and
when a rescue response message in response to the first emergency call message is received within a first duration, generating, based on the second status information and the rescue response message, a second emergency call message comprising a second accident level, and sending the second emergency call message in a second range around the first vehicle.

* * * * *